US007075411B2

(12) United States Patent
Kelly et al.

(10) Patent No.: US 7,075,411 B2
(45) Date of Patent: *Jul. 11, 2006

(54) SMART CARD FAST-CLAMPING RECEIVER FOR PULSED RF FIELDS

(75) Inventors: Guy M. Kelly, La Jolla, CA (US); Kevin J. Page, Del Mar, CA (US); Don P. Plum, San Diego, CA (US); Joseph VJ Ravenis, II, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/289,542

(22) Filed: Nov. 5, 2002

(65) Prior Publication Data

US 2003/0085802 A1 May 8, 2003

Related U.S. Application Data

(63) Continuation of application No. 09/627,548, filed on Jul. 28, 2000, now Pat. No. 6,480,101, which is a continuation of application No. 08/933,725, filed on Sep. 19, 1997, now Pat. No. 6,097,292, which is a continuation-in-part of application No. 08/825,940, filed on Apr. 1, 1997, now Pat. No. 6,010,074.

(60) Provisional application No. 60/014,444, filed on Apr. 1, 1996.

(51) Int. Cl.
*H04Q 5/22* (2006.01)

(52) U.S. Cl. .................. 340/10.1; 340/572.1; 235/487
(58) Field of Classification Search ............... 340/10.1, 340/10.34, 572.1, 572.7; 235/487, 492; 323/223
See application file for complete search history.

(56) References Cited

U.S. PATENT DOCUMENTS 4,795,898 A * 1/1989 Bernstein et al. ........... 235/487
5,045,770 A * 9/1991 Brooks ....................... 323/223
5,153,583 A * 10/1992 Murdoch ................. 340/10.34

* cited by examiner

*Primary Examiner*—Edwin C. Holloway, III
(74) *Attorney, Agent, or Firm*—Townsend and Townsend and Crew LLP

(57) ABSTRACT

A fast data transfer collection system using message authentication and contactless RF proximity card technology in non-contact storage and retrieval applications. The system is generally comprised of Host computers (application computer systems), Target radio frequency (RF) terminals, and a plurality of portable Tags ("smart" or "proximity" cards). A Host provides specific application functionality to a Tag holder, with a high degree of protection from fraudulent use. A Target provides control of the RF antenna and resolves collisions between multiple Tags in the RF field. A Tag provides reliable, high speed, and well authenticated secure exchanges of data/information with the Host resulting from the use of a custom ASIC design incorporating unique analog and digital circuits, nonvolatile memory, and state logic. Each Tag engages in a transaction with the Target in which a sequence of message exchanges allow data to be read(written) from(to) the Tag. These exchanges establish the RF communication link, resolve communication collisions with other Tags, authenticate both parties in the transaction, rapidly and robustly relay information through the link, and ensure the integrity and incorruptibility of the transaction. The system architecture provids capabilities to ensure the integrity of the data transferred thus eliminating the major problem of corrupting data on the card and in the system. The architecture and protocol are designed to allow simple and efficient integration of the transaction product system into data/information processing installations.

30 Claims, 17 Drawing Sheets

SINGLE TAG

SMART CARD FAST-CLAMPING RECEIVER FOR PULSED RF FIELDS

RELATED APPLICATIONS

This is a continuation of U.S. application Ser. No. 09/627,548, filed Jul. 28, 2000, issuing as U.S. Pat. No. 6,480,101, which is a continuation of U.S. application Ser. No. 08/933,725, filed Sep. 19, 1997, now issued as U.S. Pat. No. 6,097,292, which is a continuation-in-part of U.S. application Ser. No. 08/825,940, filed Apr. 1, 1997, now issued as U.S. Pat. No. 6,010,074, which claims the benefit of U.S. Provisional Application No. 60/014,444, filed Apr. 1, 1996.

BACKGROUND OF THE INVENTION

1. Field of the Invention

This invention generally relates to data/information collection systems and methods. More particularly, this invention relates to proximity contactless automated data/information collection systems and methods.

2. Description of Related Art

The number and frequency of fee and/or information based transactions that individuals engage in has increased dramatically over the years. As a result of this increase in transactions, the amount of paper produced and time spent engaging in and processing these transactions has also increased. Proximity card technology has been used effectively to reduce waste by eliminating the need for paper or plastic in some transactions and to increase efficiency of these transactions by reducing the time spent engaging in and processing these transactions.

Proximity card technology canced advantageously utilized in a wide variety of applications. One significant application concerns replacing small ticket/cash transactions. Worldwide, approximately 80% (225 billion) of all cash transactions are under $20 US. Proximity cards can be used to replace cash in many of these instances by allowing individuals to have value deducted from their cards as they make purchases or have value added in return for proper consideration. Other applications include, but are not limited to, use of a card as a driver's license with all of the relevant driving history stored therein, as a passport with stored visa information, as a healthcare card with a complete medical history and insurance information, or as a phone or mass-transit card with a prepaid value that is deducted from the card with the use of services. Indeed, proximity card technology can be used with any transaction that involves the exchange of data/information between individuals and an institution.

Proximity card technology has already been used effectively in mass-transit systems. Cubic Corporation, the current assignee of this patent application, developed such a systerm as is disclosed in International Application No. PCT/US92/08892, titled "Non-Contact Automatic Fare Collection System," filed Oct. 19, 1992, and published May 13, 1993, as WO 93/09516.

In this system, the proximity card retains a fare value representative of funds available for use by its holder., Value is automatically debited from the proximity card in accordance with the applicable transit fare schedules or credited in exchange for proper consideration. Waste is reduced through the elimination of paper and plastic disposable fare tickets. System throughput efficiency is also enhanced by the increased transaction speed. A typical proximity card transaction takes place roughly seven times faster than the time it takes to pass a paper ticket through a standard mechanical transport. Also, a passenger does not need to waste time finding and removing the card from a personal storage area, such as a purse or wallet, because data is transmitted via a radio frequency ("RF") field. Thus no physical or even visual contact between the proximity card and Target (reader/writer device) is required.

A demonstration system generally applying the teachings of the PCT/US92/08892 application is currently operating in the Washington Metro Area Transit Authority (WMATA) mass-transit system for rail service, ground transportation (buses), and parking lots. In the WMATA system currently in use, fare data is transmitted between the stationary GO CARD® system terminal, referred to herein as a Target, and a proximity card, referred to herein as a Tag, via a RF field.

A stationary GO CARD® system terminal consists of a Target and a Host (i.e., controlling computer). The Target includes a modulator/demodulator and an antenna designed to transmit, via an RF field with a carrier frequency of 13.56 MHz, a message modulated upon the carrier signal. During operation, the Target emits a continuous RF field designed to evoke a response from a Tag entering in the general proximity of the Target. Once a Tag is brought within range, the Target's RF transmission provides power to the Tag, and the Target sends a message to wakeup the Tag. The Tag wakes up and establishes an authenticated communication channel with the Host through the Target. The Host can then query the Tag for its stored data and write new data into the Tag. Upon completion of this transaction, the Tag is put back to sleep (inactive state).

SUMMARY OF THE INVENTION

The invention provides systems and methods for significantly enhancing the overall performance of contactless proximity automated data collection systems, which include a Tag, a Target, and a Host. In particular, the invention realizes advantages such as increased transaction speed, ensured data integrity and security, reduced cost, and reduced power consumption in a low profile Tag.

The Tag is a portable thin card carried by an individual. The Target is a radio frequency source that provides a communication link between the Tag and a Host controller.

One of the many invention features is collision resolution. In operation, one or more Tags may attempt communication with the Target at the same time. The invention prev ents the problem of collisions in communication that occur when two Tags enter the RF field at the same time. Every time a Target receives a first response from a Tag, it checks to see if the response is in proper message form. The first response is designed such that the interference of two or more Tags will likely create an improper message form. Upon receiving an improper message form, the Target will signal the Tags that the message is invalid and the Tags will back-off to retry at a later time. In the rare instance where the Target does not detect a collision when one is present, the Host does a second level of collision detection that is virtually guaranteed to prevent two or more Tags from having access to the same Target at one time.

Another feature of the invention is an improved Tag architecture that reduces the transaction time between the Tag and Target while providing a cost effective Tag with an ultra slim profile and low power requirements. For example, the invention can facilitate complete secure transit transactions in approximately 50 milliseconds (ms), which is approximately 20% of the transaction time generally required by conventional contactless proximity automated data collection systems.

In particular, the invention utilizes serial dataflow techniques and variable speed clocking for the Tag. For example, the invention uses serial, rather than parallel, methods to move data throughout the Tag to realize a significant savings in chip area. In addition, the invention utilizes a dynamic clocking system for the Tag. A low speed clock is used to facilitate communication with the Target. However, for transferring and processing data and messages within the Tag itself, a high speed clock is used.

Moreover, the invention uses one or more Linear Feedback Shift Registers (LFSR) to facilitate Tag functionality. The LFSRs greatly reduce the circuit complexity, thus increasing the speed, flexibility, and reliability of the Tag.

Another significant invention feature is the enhanced design of the Tag data memory. The invention uses ferroelectric random access memory (FRAM) for data storage thus increasing transaction speed, reducing power consumption, and increasing data reliability. For example, the invention performs a write access to a Tag in 1 microsecond (μs) rather than conventional electrically erasable programmable read only memory (EEPROM) based systems, which require approximately 10 ms. Furthermore, the FRAM writing electrical current requirements are considerably less than those of an EEPROM. Additionally, a FRAM typically works for more than 100 billion read or write cycles compared to approximately 1 million in an EEPROM.

Another invention feature is Tag data buffering techniques for ensured data integrity. The data memory includes a four page buffer (64 byte) for the incoming data. Only after every page has been verified is the data written from the buffer to its final destination, thus premature retraction of the Tag from the field will not result in partially written messages.

The Tag of the invention also provides enhanced security features. The Tag provides security on two levels: message authentication and restricted memory access. Message authentication will be discussed in detail below. Restricted memory access on the Tag ensures that only authorized Hosts can read or write to a given memory location. This is accomplished by using key partitioning. Each block of Tag memory has a pair of keys(read and write) and a Host can only access a particular block if it sends information about the necessary key with each read or write message. An additional feature of the invention is its architectural flexibility. For example, error correction and encryption are readily added to embodiments of the invention.

Yet another feature of the invention is the Tag analog power protection circuitry. The Tag prevents breakdown (inherent in all silicon chip devices) of the fabricated silicon device from fluctuation in the RF field while permitting the Tag to receive the amplitude modulation (AM) signal from the Target. In particular, the invention features a clamp circuit that is fast enough to react to a switched RF situation and to the AM signal on the RF carrier. The clamp removes the AM voltage fluctuation from the rectified carrier, however, the clamp control signal contains the AM signal, and the control signal can be used as the AM signal for the ASIC receiver circuit.

An additional benefit of this clamping technique is that the clamping voltage can be accurately determined and can be set just below the ASIC breakdown voltage, allowing the ASIC to be produced with smaller geometry and on lower breakdown processes.

The foregoing, and other features and advantages of the invention, will be apparent from the following, more particular description of the preferred embodiments of the invention, the accompanying drawings, and the appended claims.

DETAILED DESCRIPTION OF THE PREFERRED EMBODIMENTS

The currently preferred embodiments of the invention are now described with reference to the figures where like reference numbers indicate like elements. Also in the figures, the left most digit of each reference number corresponds to the figure in which the reference number is first used.

While the invention is described in the context of an electronic fare collection system for rapid transit or toll applications, it would be apparent to one skilled in the relevant art that the principles of the invention have considerably broader applicability to other systems in which contactless proximity information/data/message is exchanged, collected, or otherwise used.

The improved Target and Tag of the invention can be used advantageously in a fare collection system similar to that described in International Application Number PCT/US92/08892, titled "Non-Contact Automatic Fare Collection System," filed Oct. 19, 1992, WO 93/09516, which is incorporated herein by reference in its entirety. Thus, only the features, of the invention that differ from the system disclosed in WO 93/09516 are described in detail herein.

System Overview

Figure 1:
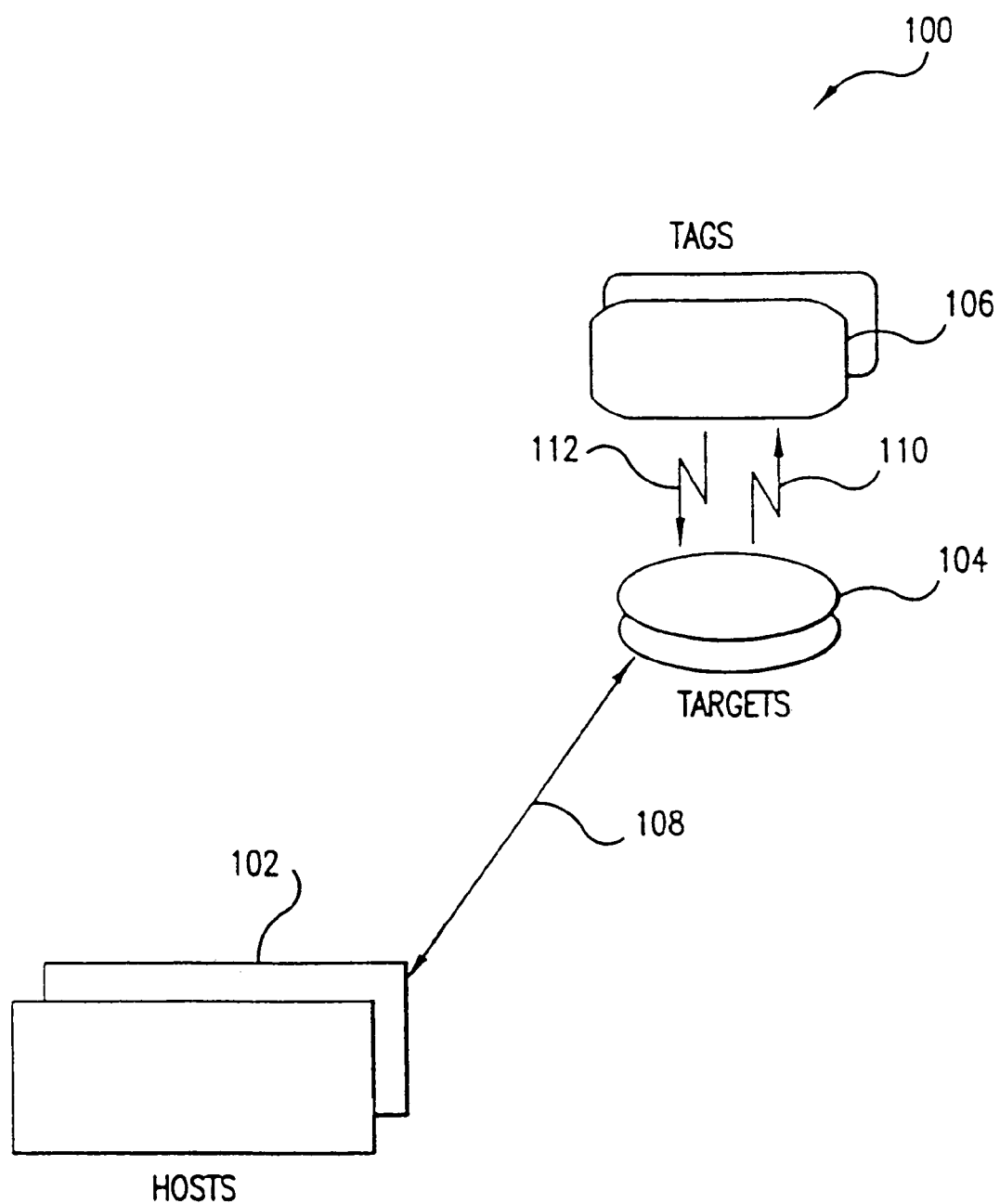
FIG. 1 is a high level block diagram of a contactless proximity automated data collection system in accordance with the principles of the invention.

FIG. 1 is a high level block diagram of a contactless proximity automated data collection system 100 in accordance with the principles of the invention. System 100 includes a plurality of Hosts 102, Targets 104, and Tags 106. As would be apparent to one skilled in the art, the number of these devices depends on the requirements of the application.

Target 104 communicates with both Host 102 and Tag 106. Target 104 and Tag 106 communicate messages and data over RF signals 110 and 112. In operation, Target 104 responds to commands from Host 102 and acts primarily as a simple serial data pass-through with bit rate conversion and collision resolution between Host 102 and Tag 106.

In this embodiment, Host 102 is positioned at a point of sale machine. Alternatively, for this type of application, Host 102 can be located at an entrance/exit gate of a train station at a ticket vending or issue machine. In general, Host 102 can be located remotely or locally with respect to Target 104. Host 102 communicates with Target 104 over a standard RS-232 serial link 108, but any known links (e.g., a RS-422 link) can be used with the invention.

In this preferred embodiment, Host 102 is an Intel® Pentium® based computer system running Windows NT®. However, any sufficiently powerful computer system (e.g., Intel® Pentium® Pro or Pentium® II based computer systems) and operating system (e.g., Microsoft® Windows®) can be used. For example, a dedicated controller using a Motorola® 68332 microprocessor with a real-time operating system or any other appropriate microprocessor can be used.

Host 102 contains predetermined executable programs (software or code) that achieve the functionality of the specific application. These programs correspondingly invoke (call) functions within a CARCG GO CARD® subroutine library, provided by Cubic Corporation. The subroutine library provides the necessary control to facilitate low level message and data input/output processing.

Figure 2:
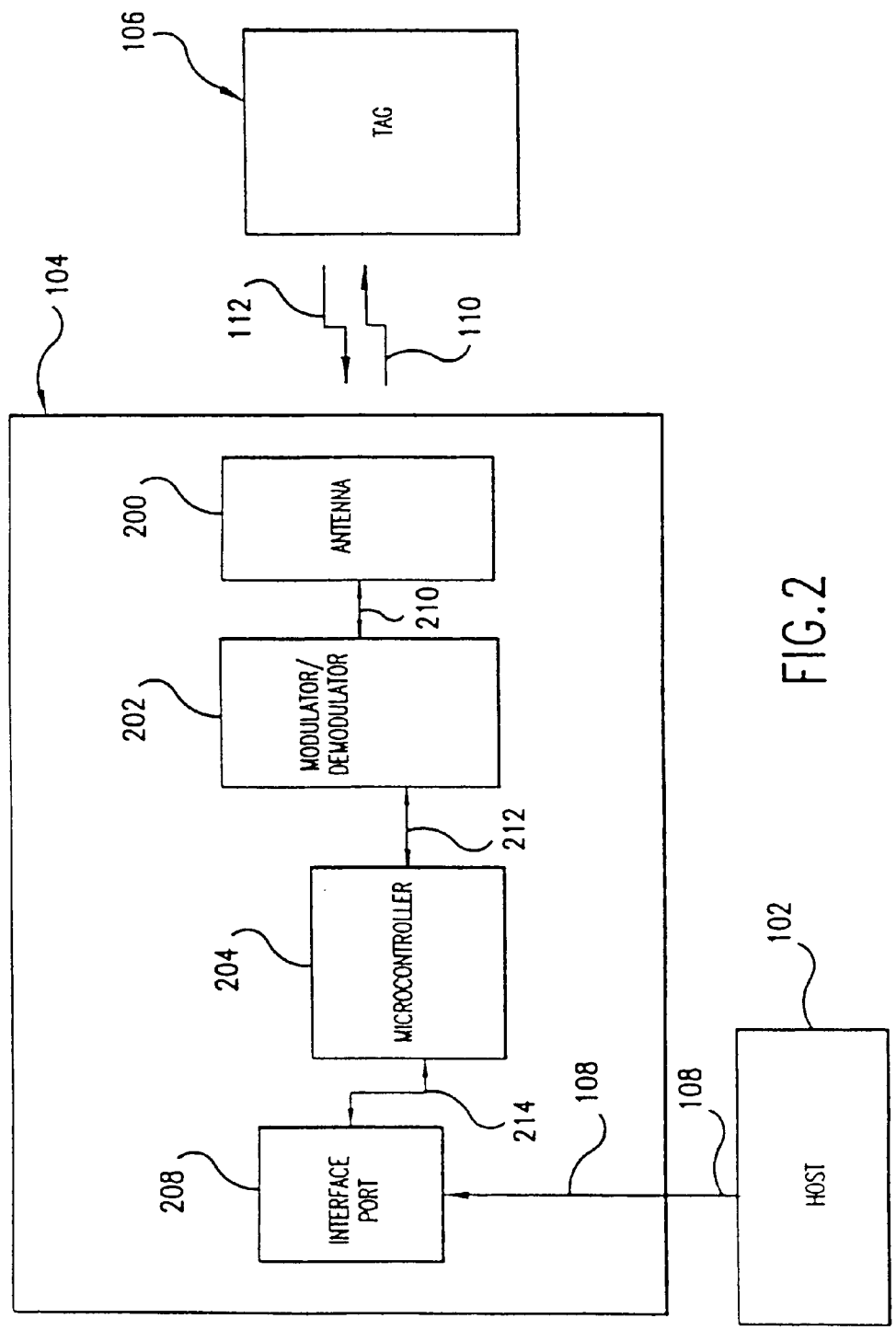
FIG. 2 is a high level block diagram of a Target.

FIG. 2 is a block diagram of Target 104 in accordance with the principles of the invention. Target 104 includes an antenna 200, a modulator/demodulator 202, a microcontroller 204, and a RS-232 serial interface port 208. Microcontroller 204 receives a clock signal from quartz crystal (not shown). In this embodiment, microcontroller 204 is a DS87C520 microcontroller commerically available from Dallas Semiconductor, interface port 208 is a RS-232 interface from Linear Technology, and antenna 200 is a 3 µHy, PC board coil, which are all available from numerous sources. Any commercially available parts, however, can be employed for these components.

As with Host 102, microcontroller 204 has predetermined programs, residing therein, to facilitate the overall functionality of Target 104. That is, the predetermined programs are written in suitable code with any known programming language, to implement the logic carried out in the protocols discussed below (including the collision resolution protocol) with reference to FIGS. 4A–C, 6A–B, and 7A.

In general, Host 102 controls and coordinates the exchange of messages/data between Target 104 and Tag 106. These exchanges are conducted with a half-duplex communication protocol. RF signals 110 and 112 have a carrier frequency of 13.56 MHz per ISO/IEC 14443 standard and are amplitude modulated at 115.2 Kbps for data transmission. As would be appreciated by one of ordinary skill in the relevant art, other well known protocols, transmission rates, and various modulation techniques can be utilized with the invention.

In operation, Target 104 receives modulated Tag messages/data over RF signals 112. Antenna 200 receives these messages/data and conveys them (over interconnection 210) to modulator/demodulator 202 for demodulation. In turn, each Tag message/data is conveyed (over interconnection 212) to microcontroller 204, whereupon, depending on the message/data type, it is either processed or relayed (over interconnection 214) to serial interface port 208 and then to Host 102 (via serial link 108). In similar manner, Target 104 transmits modulated Target messages/data to Tag 106 over RF signals 110. Target messages/data can originate solely from microcontroller 204 or from microcontroller 204 in conjunction with Host 102. Modulator/demodulator 202 modulates the messages/data, and antenna 200 transmits the corresponding RF signals 110 to Tag 106. Microcontroller 204 and Host 102 process the Tag and Target messages/data in accordance with the particular configured application (e.g., in this embodiment, a rapid transit application).

Figure 3:
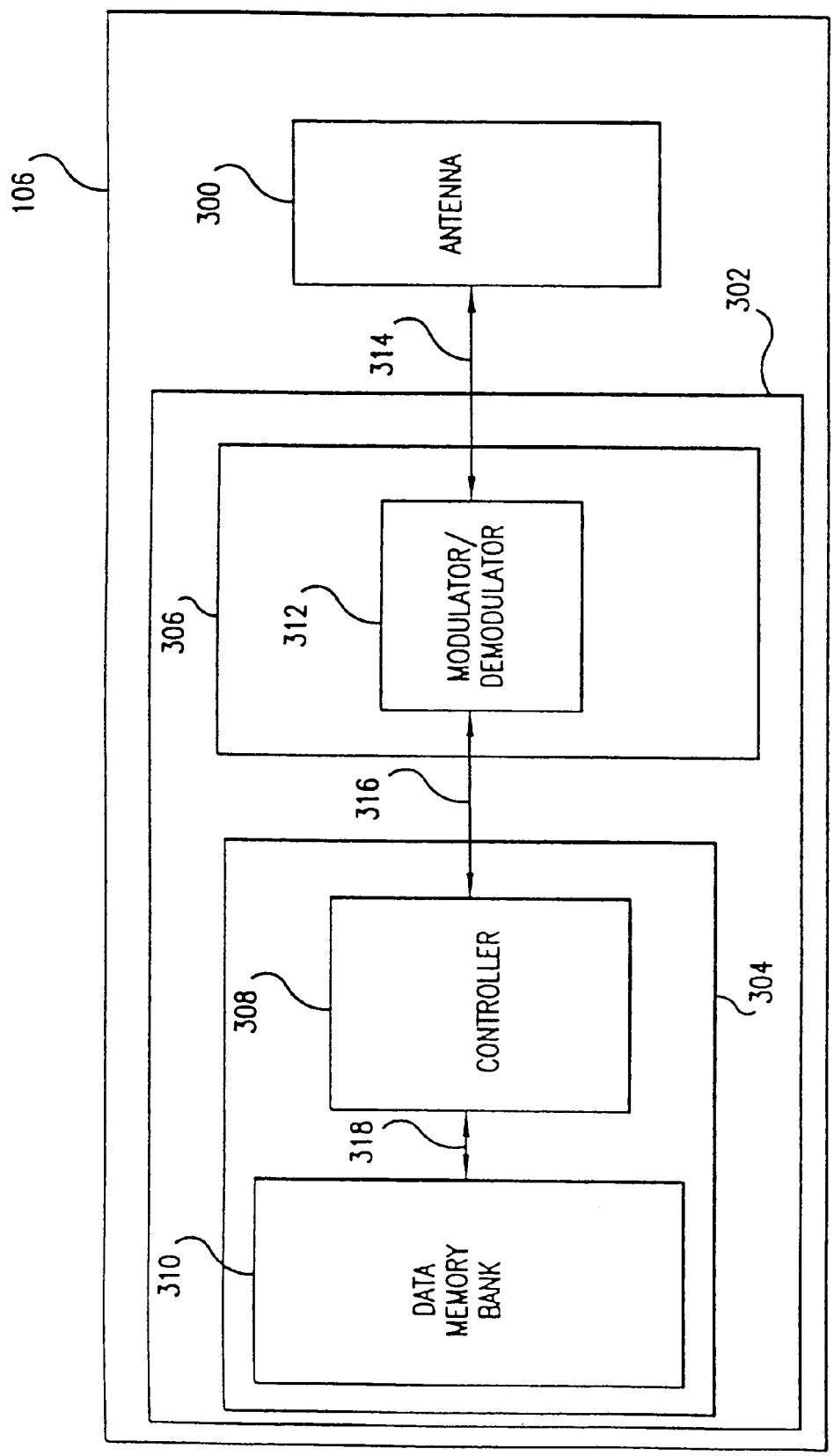
FIG. 3 is a high level block diagram of a Tag.

FIG. 3 is a high level block diagram of Tag 106 in accordance with the principles of the invention. In this preferred embodiment, Tag 106 includes an antenna 300 and a Tag application specific integrated circuit (ASIC) 302 (Tag ASIC 302), which will be commercially available from Cubic Corporation. The following discussion includes only a very high level discussion of Tag 106 with respect to the system level features of the invention. The Tag Detailed Description section below provides a more detailed discussion of Tag 106.

Tag ASIC 302 is partitioned into a digital subsystem 304 and an analog subsystem 306. Digital subsystem 304 includes a controller 308 and a data memory bank 310. Analog subsystem 306 includes a modulator/demodulator 312.

Similar to the operation of Target 104, messages/data are transmitted to and from Tag 106 via RF signals 110 and 112, respectively. Target messages/data (modulated on RF signals 110) are received by antenna 300. Once received, Target messages/data are conveyed (via interconnection 314) to modulator/demodulator 312 for demodulation. Each Target message/data is then conveyed via interconnection (interface) 316 to controller 308 and processed in accordance with the configuration of controller 308. Data memory bank 310 is used to hold application data which is accessed over interconnection 318.

Tag messages/data (modulated on RF signals 112) are transmitted from antenna 300. Controller 308 provides both message generating and data accessing functions. Each message/data is then conveyed to modulator/demodulator 312 for modulation. Messages are finally conveyed to antenna 300, whereupon they are transmitted to Target 104 as RF signals 112.

Although the invention has many other applications, an overriding performance requirement imposed on a GO CARD® system when used for automatic fare collection, especially in a transit environment (e.g., subway, bus, parking lot, toll road, etc.), is that a fare transaction must be completed in less than approximately 0.1 second. This requirement has been established as the result of human factors studies and extensive field trials.

As such, the 0.1 second transaction period does not allow the extra time required to insert a Tag into a Target so that it can be captured until the transaction is complete. If the Tag cannot be captured, the system must be able to handle the withdrawal of the Tag from the vicinity of the Target at any time during the transaction without the Tag non-volatile data being corrupted.

The invention satisfies this and other requirements by utilizing a high communication rate (115.2 kilobits/second), an efficient communication protocol (including implied acknowledgments), ensured state transitions (after transmitting a message, the Tag enters a predetermined state and is prepared to receive the next incoming byte without the overhead of any extra synchronization bytes), an intelligent collision avoidance protocol (which includes sending application type information within an "imawake" message to avoid the extra overhead of a separate request message from the Target), and FRAM for non-volatile Tag buffer and permanent data memory (0.6 μs write time verses up to 10,000 μs for EEPROM). The use of FRAM for non-volatile data buffering also reduces transaction time (and memory required) when used to prevent data corruption.

Preventing data corruption is addressed by the use of FRAM for Tag non-volatile buffering of received write-data (including automatic write completion on power-up), by the Tag's monitoring of its available RF and DC power (to guarantee that any write to the FRAM will complete before power can be lost), using a combination of missing clock detection, hysteresis, and pulse stretching in the reset circuit to provide a fast, sufficiently wide and stable reset (to avoid unstable or inadvertent FRAM writes and also avoid the size and power inefficiencies of a phase-locked loop), and by using a message digest as a check of the integrity of the received message.

Additional operational constraints/regulatory requirements imposed on the system are that there be no cross-talk between adjacent Targets (because of the required close placement of Targets in some fare collection systems) and that the system be capable of being certified (FCC and other regulatory requirements).

Cross-talk between adjacent Targets is eliminated by using impedance (or load) modulation from Tag to Target. For example, the Tag must be close to the Target which has powered it up and only modulates the RF field of that Target. The RF field provided by the Target to the Tag decreases as the cube of the distance between them when that distance is greater than the radius of the Target antenna.

Regulatory certification is aided by the Target using a small amount (less than 20%) of amplitude modulation (ANM) for communicating with the Tag (thus producing small amplitude sidebands) and by increasing rather than decreasing the carrier amplitude during modulation (thus reducing the required average carrier power). The Target also has the capability of operating at significantly reduced average carrier power (either by detecting the presence of a Tag and only operating at full power for the 0.1 second transaction time or by pulsing the RF carrier to full amplitude with a short duty cycle until a Tag responds for the 0.1 second transaction time).

Several other operational factors determine whether a system can meet the above requirements. They include:
- the complexity of the transaction and the amount of data that must be updated,
- the transmission overhead imposed by the communication data rate and format,
- the time required by the Host to process the data to be updated,
- the time required for the Tag to write the received data to non-volatile memory,
- the overhead involved in assuring that no data corruption can occur,
- the overhead involved in authenticating that a valid Tag is being used,
- and the Tag and Target operating power, frequency, and transmission methods.

These items are discussed in greater details in the following sections.

Protocol Description

FIGS. 1–3 illustrate a high level block diagram of a Host-Target-Tag system in accordance with te principles of the invention. The Host-Target-Tag protocol includes a series of predetermined message exchanges. In general, Target messages are generated by either a microcontroller 204 or a Host 102 and Tag messages by a controller 308 in accordance with the software or logic residing therein. A message is typically, but not necessarily, approximately one byte or greater in length, and may represent control information for controlling the operation of a Target 104 or a Tag 106, message identification information, authentication information, or other information desired for each particular application in which the invention is employed.

The messages/data are exchanged to provide the following general functionality: allow Host 102 to set the operating mode of Target 104 and/or determine the current state of Target 104; allow Target 104 to detect initial entry of Tag 106 into the RF field and mediate between multiple Tags that enter the RF field simultaneously; and allow Host 102 to exchange data with Tag 106 in a manner that provides resistance to tampering. Table 1 summarizes the general function of each field for particular messages.

TABLE 1

| Msg Type | Data Fields |
| --- | --- |
| command | Start of message byte |
|  | Type code "command" |
|  | Address bits |
|  | Wakeup control |
|  | Tag mode |
|  | RF modulation |
|  | Card sense threshold |
|  | RF field control |
|  | LED settings |
|  | LED controls |
|  | Error check bytes |
| wakeup | Start of message byte |
|  | Type code "wakeup" |
|  | Host random number |
|  | Error check bytes |
| status | Start of message byte |
|  | Type code "status" |
|  | Current Target status |
|  | Error check bytes |
| diagreq | Start of message byte |
|  | Type code "diagreq" |
|  | Diagnostic type code |
|  | Error check bytes |
| diagrsp | Start of message byte |
|  | Message type "diagrsp" |
|  | Diagnostic result codes |
|  | Error check bytes |
| nak | Single "nak" byte |
| imawake | Start of message byte |
|  | Type code "imawake" |
|  | Tag random number |
|  | Tag ID bytes |
|  | Tag block directory |
|  | MAC bytes |
| readpage | Start of message byte |
|  | Type code "readpage" |
|  | Page Number |
|  | MAC bytes |
| sendingpage | Start of message byte |
|  | Type code "sendingpage" |
|  | Page number |
|  | Page content bytes |
|  | MAC bytes |
| writepage | Start of message byte |
|  | Type code "writepage" |
|  | Write sequence number |
|  | Page number |

TABLE 1-continued

| Msg Type | Data Fields |
|---|---|
| | New page content bytes |
| | MAC bytes |
| ack | Start of message byte |
| | Type "ack" |
| | Page number |
| | MAC bytes |
| ping | Random 8-bit value |
| | Value XORed with 55H |
| pongvalid | Single "pongvalid" byte |
| ponginvalid | Single "ponginvalid" byte |

Typical protocol exchanges of this preferred embodiment are now discussed with reference to Table 1 and FIGS. 4A–C, 5A–B, 6A–B, and 7A–B.

Host-to-Target Message Exchanges

Figure 4A:
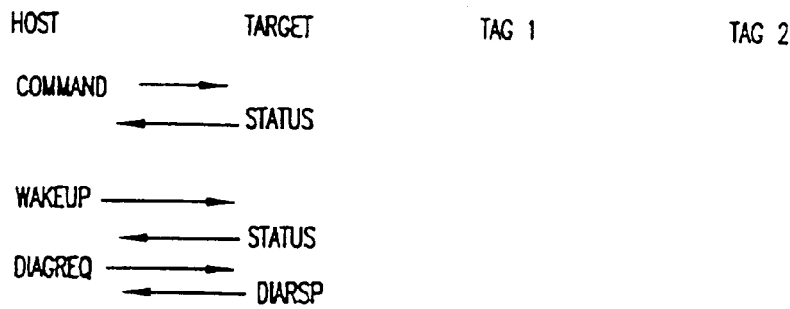
FIG. 4A illustrates a typical Host-Target message exchange.

FIG. 4A illustrates a typical Host-to-Target message exchange. Host-to-Target message exchangesoccur when Host 102 has need to modify the operating state of Target 104. Host 102 may initiate this type of exchange at any time, assuming the previous exchange has either completed or a time-out has occurred.

Host 102 sends two message types ("command" and "wakeup") to Target 104. In response, Target 104 sends a "status" message type to Host 102. Host 102 may optionally send a third message type ("diagreq") to Target 104. In response, Target 104 will reply with a "diagrsp" message type to Host 102.

Host 102 sends the "command" message to Target 104 to set the operating state of Target 104. Upon receiving a valid, correctly addressed "command" message, Target 104 takes the actions specified by the various data fields of the "command" message. Host 102 also sends the "wakeup" message type to direct Target 104 to begin broadcasting "wakeup" messages into the RF field.

Target 104 sends the "status" message to Host 102 to confirm correct reception of either a "command" or a "wakeup" message. The "status" message contains the same data fields that are present in the "command" message. The "status" message reports the current setting of these data fields in the Target 104 memory, which were set by the previously received "command" and/or "wakeup" messages.

Host 102 also sends the "diagreq" message type to direct Target 104 to perform one of several diagnostic routines, then report the result in a "diagrsp" message. In response, Target 104 sends the "diagrsp" message to Host 102 to confirm correct reception and report the results of processing the "diagreq" message.

Target-to-Tag Message Exchanges

Target-to-Tag message exchanges generally fall into two cases: a single Tag attempting communication with a Target (a normal case 500); and two or more Tags concurrently attempting communication with a Target (collision resolution case 514).

Figure 4B:
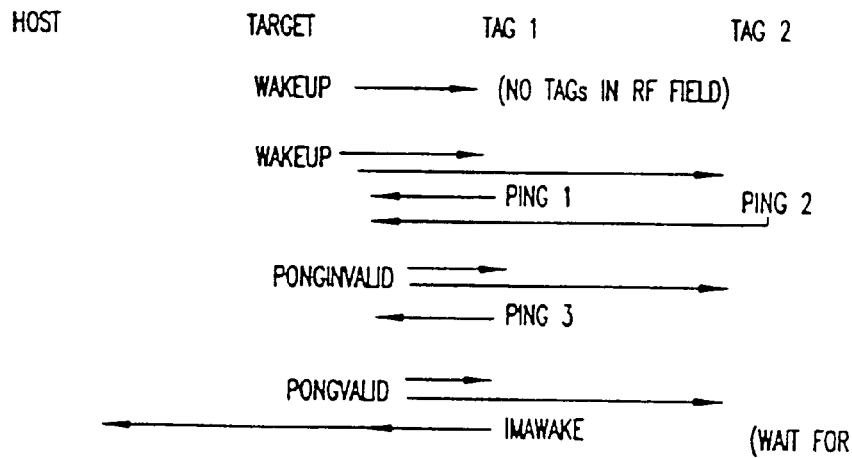
FIG. 4B illustrates a typical Target-Tag message exchange.

FIG. 4B illustrates a Target-to-Tag exchange for both cases. Target-to-Tag message exchanges occur after Host 102 has sent a valid "wakeup" message to Target 104, as described above.

Target 104 sends three message types ("wakeup," "pongvalid," and "ponginvalid") to Tag 106, and Tag 106 sends two message types ("ping" and "imawake") to Target 104. Target 104 forwards the "imawake" message to Host 102.

Figure 5B:
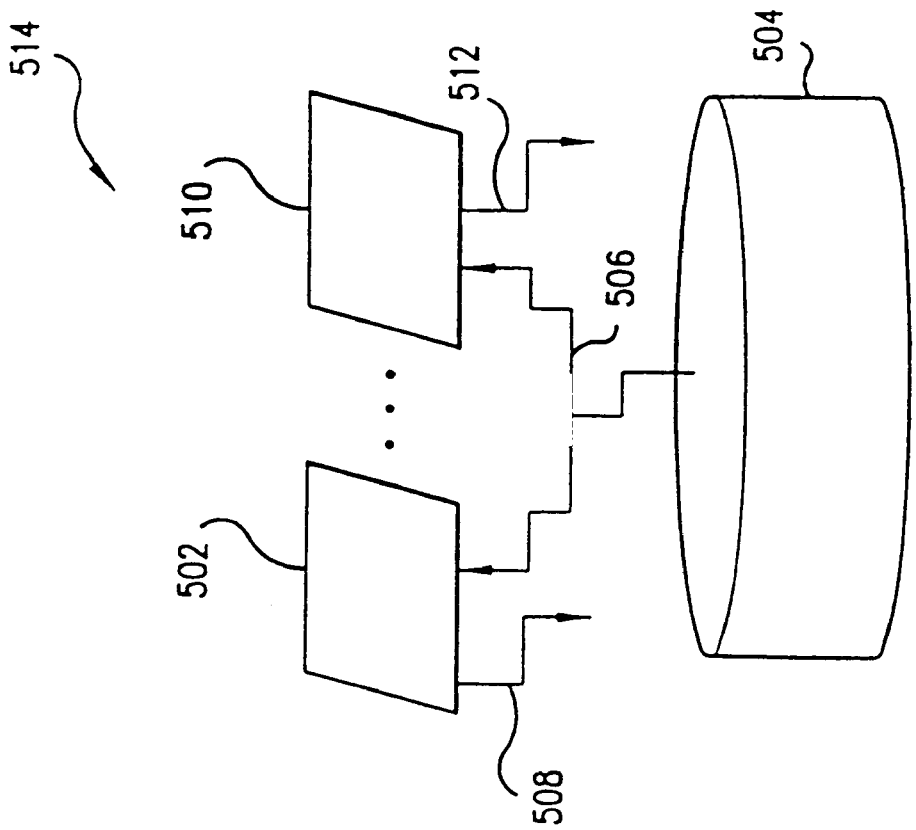
FIG. 5B illustrates two or more Tags attempting to communicate with a Target.
Figure 5A:
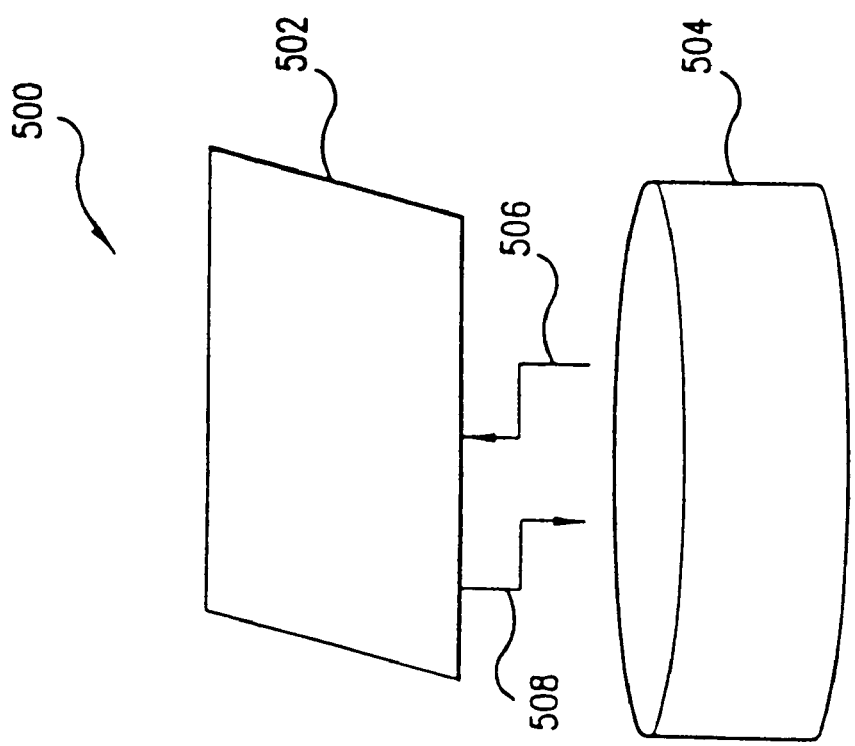
FIG. 5A illustrates a single Tag attempting to communicate with a Target.

FIG. 5A illustrates a single Tag 502 attempting to communicate with a single Target 504 before fare data is transferred between Target 504 and Tag 502 (normal case 500). Before Target 504 establishes communication with Tag 502, Target 504 lies in a pulsing mode in which it periodically transmits, under the control of microcontroller 204, a "wakeup" message (modulated on an RF signal 506).

Figure 6A:
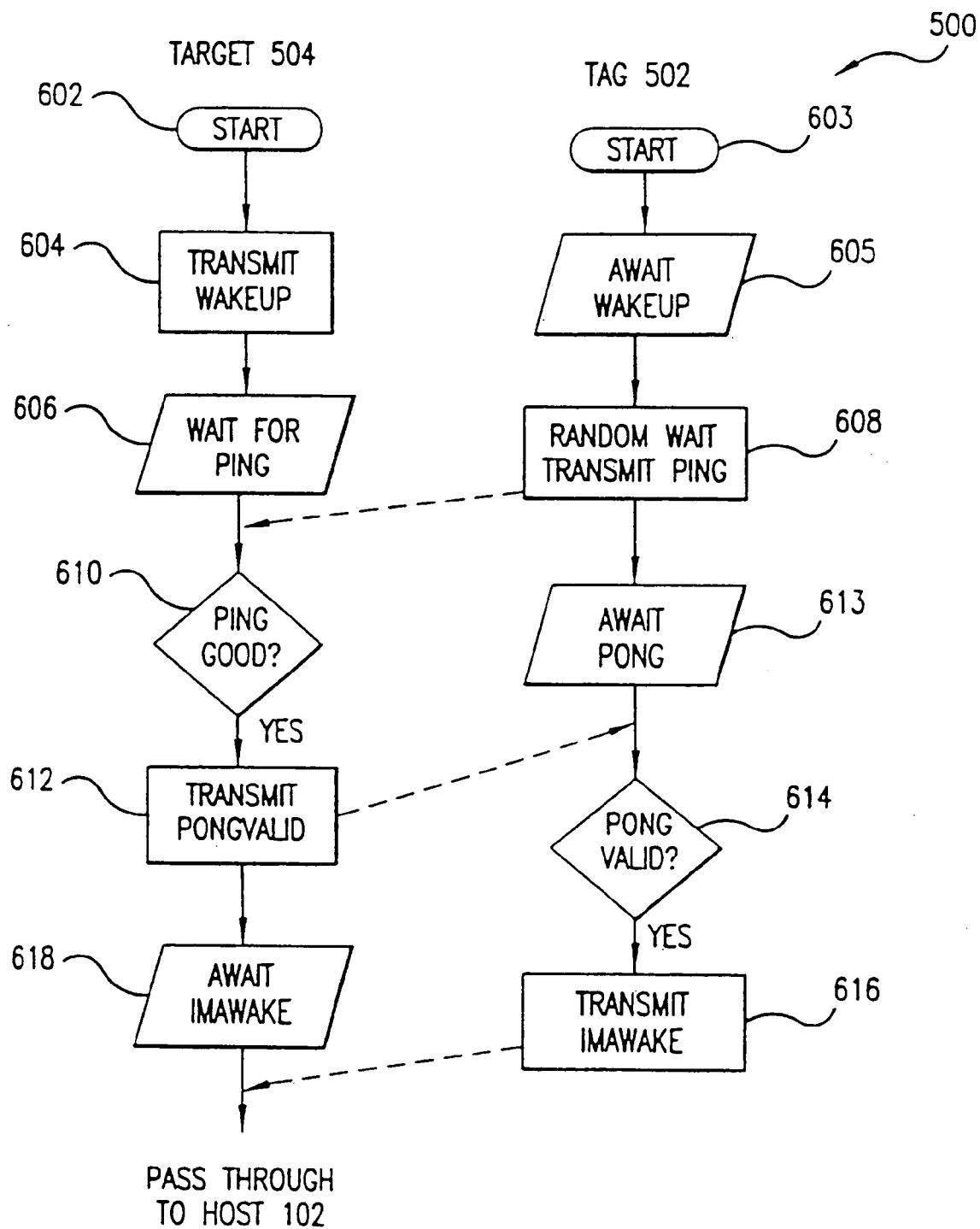
FIG. 6A illustrates a collision resolution protocol scenario for the situation depicted by FIG. 5A.

FIG. 6A illustrates a flow diagram for a communication protocol between Target 504 and Tag 502 for normal case 500 depicted in FIG. 5A. At powerup, Host 102 engages Target 504 (step 602). Host 102 then sends the "wakeup" message type to direct Target 504 to begin broadcasting "wakeup" messages into the RF field. The "wakeup" message contains a sync or start of message character, a message identification character, a random number (generated by Host 102 and previously sent to Target 104), and error check bytes. Target 504 transmits "wakeup" signals periodically (step 604) and waits for a "ping" (step 606).

When Tag 502 is presented in proximity to Target 504, Tag 502 powers up (step 603) and then awaits the next "wakeup" message from Target 504 (step 605). After receiving the "wakeup" message and a random wait period, Tag 502 responds with a "ping" message (step 608). The random wait period of Tag 502 is a random multiple of a "slot time," preferably, but not limited to, an integer from 0–3. The slot time is typically chosen to be greater than the round-trip communication time, from Tag 502 and back to Tag 502, of the "ping" and "pongvalid" messages discussed below.

A "ping" message may be two characters (bytes) in length and contains a randomly generated number followed by its duplicate exclusive-ored (XORed) with the value hexadecimal 55 (binary "01010101"). Although this specification is not limited to such A method of creating a collision check, this method is preferred because it can detect collision of any two Tags so long as they send different random numbers.

Microcontroller 204 verifies that the "ping" message contains a random number followed by its check byte (step 610), and generates a "pongvalid" message (step 612) The "pongvalid" message may be one character in length. Target 504 then awaits the "imawake" message from Tag 502 (step 618)

Meanwhile, Tag 502 awaits the "pongvalid" message from Target 504 (step 613). Upon receiving this message, Tag 502 checks its validity (step 614) and responds with an "imawake" message (step 616). The "imawake" message includes a synchronizing or start of message character, a message identification character, a Tag identification number and directory of blocks, a pseudo-random number generated bv Tag 502 for authentication, and a message digest. Communication between Host 102 and Tag 502 is established. Thereafter, fare data residing in the memory of Tag 502 is read and transmitted to an application program of Host 102, which manipulates the fare data in accordance with its software and generates new fare data to be written onto the memory of Tag 502.

FIG. 5B illustrates two or more Tags 502, 510 attempting to establish communication with a single Target 504 (collision resolution case 514). In other words, multiple Tags 502, 510 are placed in proximity to a Target 504 at or near the same time. For example, this may occur if two train passengers exit or enter a station and present their respective Tags 502, 510 to Target 504 at the same time, or if a single passenger is carrying two or more Tags 502, 510 in a wallet or purse. Because RF signals 506 from Target 504 are capable of providing power to multiple Tags 502, 510, such simultaneous attempts to communicate with Target 504 are possible. Each Tag 502, 510 transmits RF signals 508, 512 that may collide with each other and prevent successful communication.

In this scenario, Target 504, in accordance with the principles of the invention, detects potential collisions and performs resolution. The collision resolution feature of the invention is also discussed in related, commonly owned, co-pending U.S. application Ser. No. 08/825,940, filed Apr. 1, 1997, which is incorporated herein by reference in its entirety. Target microcontroller 204 is programmed to administer the collision resolution protocol of the invention.

Figure 6B:
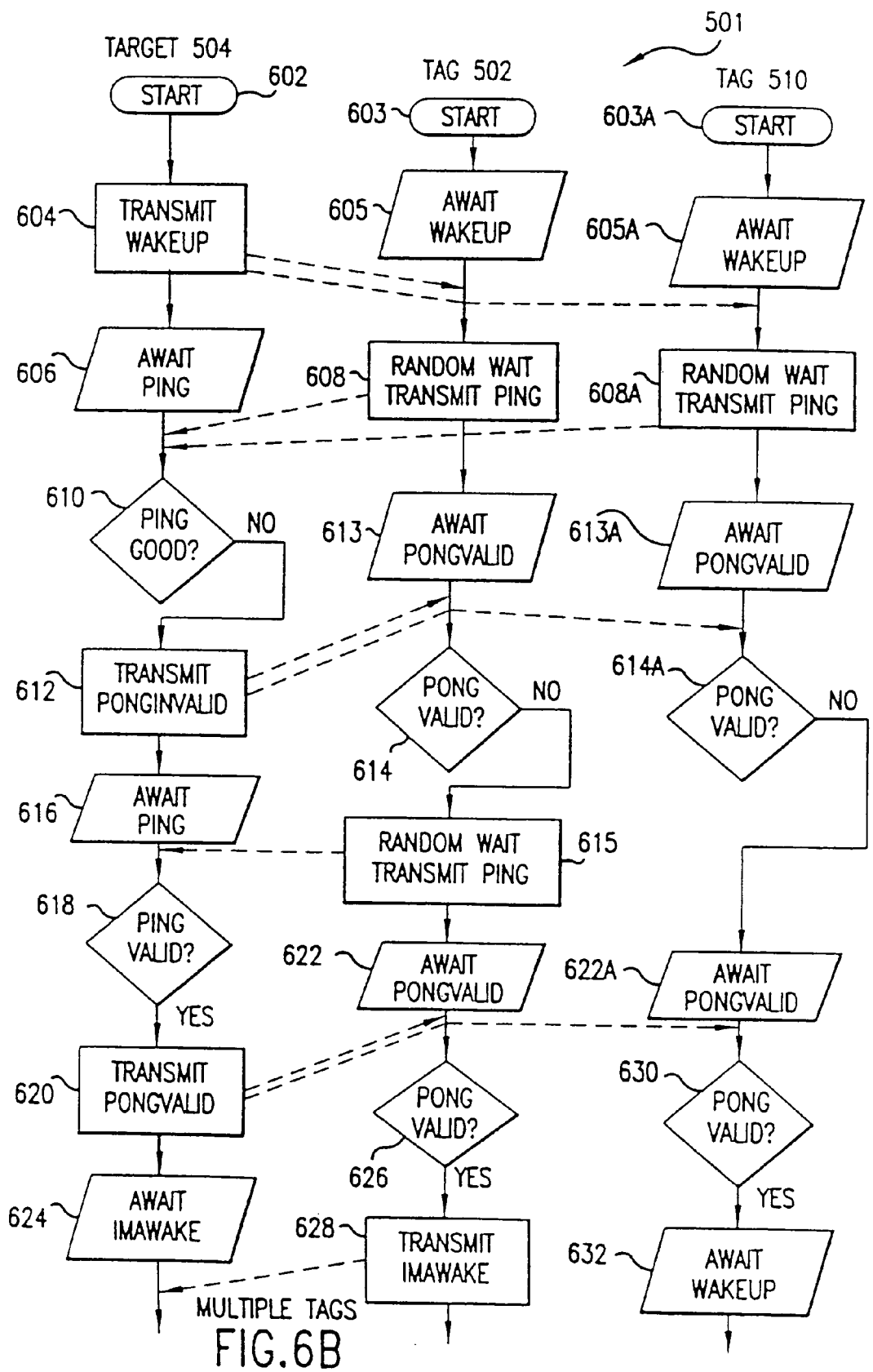
FIG. 6B illustrates a collision resolution protocol scenario for the situation depicted by FIG. 5B.

FIG. 6B illustrates a flow diagram for the execution of the collision resolution protocol by Target 504 and Tag 502, 510 for collision resolution case 514 depicted in FIG. 5B. Before communications are established between Target 504 and any Tag (e.g., 502, 510) (step 602), microcontroller 204 controls Target 504 to periodically generate and transmit a "wakeup" message (step 604) originating from Host 102, via RF signals 506 (shown in FIG. 5B). Target 504 then awaits a "ping" message from any Tag (step 606).

If multiple Tags 502, 510 are in the proximity of Target 504, each Tag 502, 510 powers up (steps 603, 603A) and awaits a "wakeup" message (steps 605, 605A). Upon receiving the "wakeup" message, each Tag 502, 510 independently responds (steps 608, 608A), after a random wait period, with a "ping" message via RF signals 508, 512, respectively (shown in FIG. 5B). The random wait period of each Tag 502, 510, is a random multiple of a "slot time," preferably, but not limited to, an integer from 0–3. The slot time is typically chosen to be greater than the round-trip communication time, from a Tag and back, of the "ping" and "pongvalid" messages discussed above. In this preferred embodiment, the slot time is 0.35 milliseconds.

The value of the first byte of the "ping" message is also chosen randomly by each Tag 502, 510. If Tags 502, 510 generate equivalent random wait periods, but different random "ping" values, and collide by responding simultaneously and transmitting a response in the form of a "ping" message via RF signals 508, 512, Target 504 does not receive a coherent "ping" message (step 610). As discussed above, this should consist of a random number followed by its "inverse." The incoherent "ping" message resulting from the simultaneous reception of two "ping" messages (RF signals 508, 512), is not recognized as valid by microcontroller 204 of Target 504. In the case of non-recognition, microcontroller 204 directs Target 504 to transmit, via RF signal 506, a "ponginvalid" message to Tags 502, 510 (step 612). In this preferred embodiment the "ponginvalid" message is one character in length. Target 504 then awaits a "ping" message (step 616).

The colliding Tags 502, 510 await a "pongvaild" message (steps 613, 613A). Upon receiving the "ponginvalid" message (steps 614, 614A), each Tag 502, 512 again prepares to transmit a "ping" message via RF signals 508, 512, after another randomly generated random wait period (step 615). If microcontroller 204 of Target 504 receives a recognizable "ping" message (step 618), it immediately replies with a "pongvalid" message (step 620), via RF signal 506. Then Target 504 waits the "imawake" signal (step 624).

Both Tags 502, 510 await a "pongvalid" message (steps 622, 622A). Upon receiving the "pongvalid" message, Tags 502, 510 check its validity (steps 626, 630). Any Tag that has yet to transmit a "ping" message as a result of its randomly generated wait period, remains silent (step 632). The Tag that transmitted the "ping" message engages in communication with Host 102 by responding with an "imawake" message (step 628).

Finally, if Host 102 does not recognize the "imawake" message transmitted by the chosen Tag, collision is again assumed and Host 102 transmits a "wakeup" message to be transmitted by Target 504 periodically, under control of microcontroller 204. Collision in this instance is caused by both Tags 502, 510 selecting the same random slot number and the same random "ping" value. When both Tags receive a "wakeup" message after transmitting simultaneous "imawake" messages, both Tags select new random slot times and "ping" values and wait for another "wakeup." Host 102 recognizes this type of collision by detecting an incorrect message digest on the received "imawake" message, the digest of which results from the two Tags' individual "imawake" messages merging in the RF field. Because each Tag includes both its unique eight byte identification value and a randomly generated six byte number, the six byte message digest will not be correct on arrival at Host 102.

Tag 106 sends the "imawake" message once only, after the successful completion of the collision avoidance exchange described above.

Figure 7A:
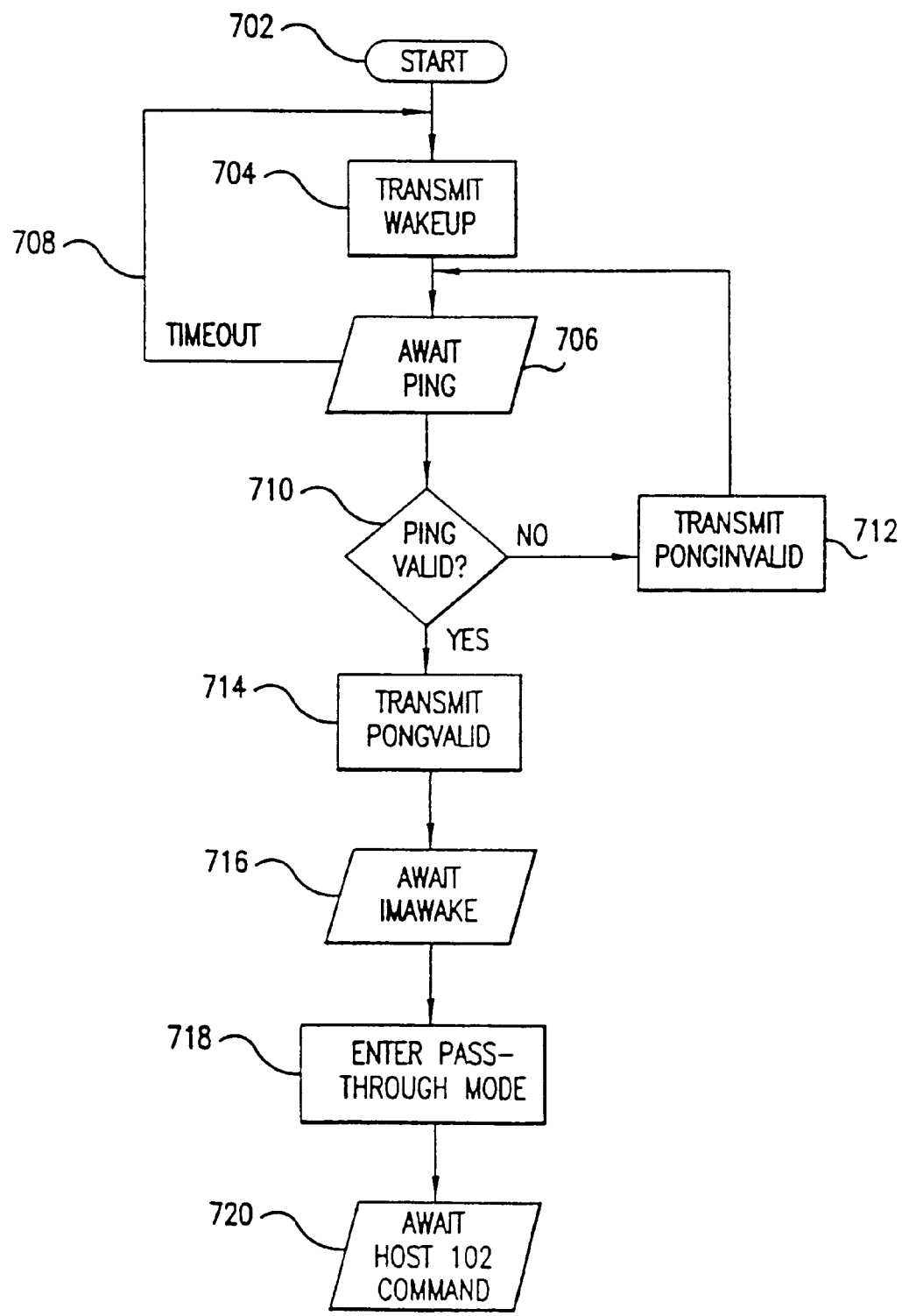
FIG. 7A illustrates a collision resolution protocol for a Target state machine.

FIG. 7A illustrates the collision resolution protocol for a Target state machine. After start up (step 702), Target 104 transmits a "wakeup" message (step 704) and waits for a "ping" message (step 706). If a timeout occurs (step 708), Target 104 transmits another "wakeup" message (step 704). If a "ping" arrives before a timeout, then Target 104 checks to make sure the "ping" message is valid (step 710). If the "ping" is invalid, Target 104 sends a "ponginvalid" message (step 712) and again waits for a "ping" message. If the "ping" is valid, Target 104 sends a "pongvalid" message (step 714) and awaits an "imawake" message (step 716). Upon receiving a valid "imawake," Target 104 enters a pass-through mode (step 718). In pass-through mode, Target 104 passes data or instructions between Host 102 and Tag 106 while waiting for a command from Host 102 (step 720).

Host-to-Tag Message Exchanges

Figure 4C:
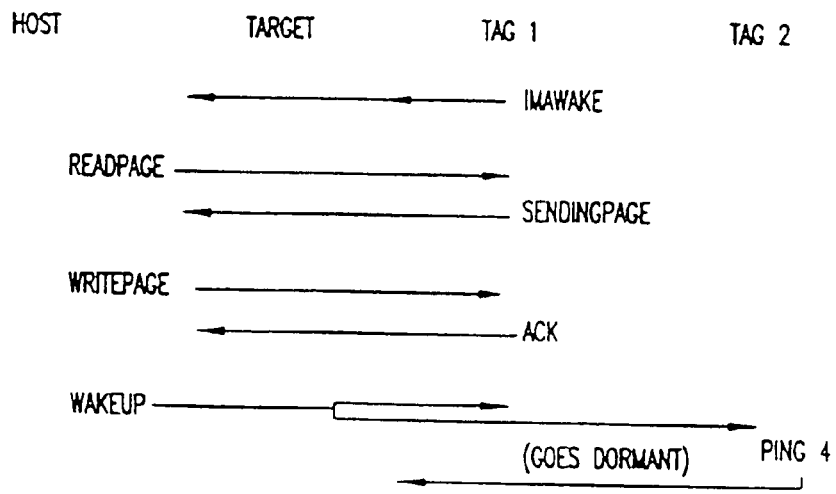
FIG. 4C illustrates a typical Host-Tag message exchange.

Host-to-Tag message exchanges are illustrated in FIG. 4C. Host-to-Tag message exchanges begin when a Target-to-Tag exchange, including the Collision Resolution process described above, results in Tag 106 sending an "imawake" message to Target 104. Target 104 passes the "imawake" message on to Host 102, then simply passes all bytes received from Host 102 through to Tag 106 and all bytes received from Tag 106 through to Host 102. This continues until Host 102 sends another "wakeup" message to Target 104 to start searching for another Tag.

Assuming Host 102 receives a valid "imawake," the serial number and directory information from the "imawake" message is passed to the application logic, which will decide to read one or more Tag pages, and optionally write one or more Tag pages.

Host 102 reads Tag 106 data pages by transmitting a "readpage" command to Tag 106, and expects to receive a "sendingpage" response containing the requested data. Host 102 sends the "readpage" message to Tag 106 to request the current contents of a specific 16-byte page of Tag 106's memory. Tag 106 sends the "sendingpage" message to Host 102 to satisfy a received "readpage" request.

Host 102 writes Tag 106 data pages by transmitting a "writepage" command to Tag 106 containing the new data, and expects to receive an "ack" response confirming receipt by Tag 106.

Tag 106 responds with a "nak" message if a "readpage" or "writepage" command is received with an incorrect MAC. With the first "nak" reply, the Host can assume the message was received with error and was not accepted. Beyond this the Host may be using the wrong key.

If Tag 106 receives a "wakeup" message at any time after transmitting its "imawake" message and receiving at least one "readpage" or "writepage" (with either correct or incorrect MAC), Tag 106 will enter a dormant state. This allows any other Tags in the RF field to begin their own Target-to-Tag and Host-to-Tag message exchanges.

If Tag 106 receives a "wakeup" message after transmitting its "imawake" message, but before a "readpage" or "writepage" message is received, Tag 106 will revert to waiting for a "wakeup" message as though it had just entered the RF field. This allows the system to deal gracefully and transparently with the collision avoidance described above.

The preferred emobodiment of the invention also includes features such as linked data page writes and message authentication.

Linked Data Page Writes

In this preferred embodiment of the invention, Host 102 may execute as many as four "writepage" commands and specify that the several requested data page writes be executed as a single logical write by Tag 106. However, the invention can be practiced with a larger number of linked writes.

Host 102 specifies this linking of data page writes by inserting non-zero values in the "write sequence number" field of all but the last "writepage" command, and inserting the zero value in the last "writepage" command.

Tag 106 uses the "write sequence number" to determine which of four temporary buffers the "writepage" commands will be stored in, and maintains validity flags for each of the four temporary buffers.

When a "writepage" command with a non-zero value in the "write sequence number" field is received by Tag 106, the MAC is checked, and an "ack" or "nak" response message is sent to Host 102 based on the results of the check, but the data bytes of the "writepage" command are not transferred to the designated page number. If the MAC was correct, the validity bit for the temporary buffer is set before the "ack" message is sent.

When a "writepage" command with the zero value in the "write sequence number" field is received, Tag 106 again checks the MAC. If the MAC is incorrect, Tag 106 responds with a "nak" message. If the MAC is correct, Tag 106 sets the validity bit for temporary buffer numbered zero and copies the data bytes from the temporary buffer numbered zero to the addressed page. Then, if the validity bit for the temporary buffer numbered one is set, Tag 106 copies the data bytes from the temporary buffer numbered one to the page number addressed by that command. The same check is applied to temporary buffers numbered two and three, in that order, until a temporary buffer with its validity bit not set is encountered, or until all four temporary buffers have been copied, at which time Tag 106 dears all four validity bits and responds to Host 102 with the "ack" message.

If Tag 106 is removed from the RF field at any time after setting the validity bit for temporary buffer zero, but before completing the transfer(s) of data from the temporary buffer(s) to the designated page(s) and clearing the validity bits, Tag 106 will complete the transfer(s) on its next entry into the RF field, before beginning the collision resolution process.

Host 102 can therefore assume that either all of the linked "writepage" commands will be completed, or none will be started, relieving Host 102 of substantial overhead to accomplish the equivalent multiple page write coherence through other techniques, and ensuring that the data in the linked pages of Tag 106 will be in either the original condition or in the completely updated condition. Thus, a declining balance in one page, for instance, can be linked positively with a transaction record in another page, such that if Tag 106 is removed from the RF field at any arbitrary point in the life of a transaction, its linked pages will either reflect the new (decremented) balance and the associated transaction detail or the original (undecremented) balance and no record of the incomplete current transaction.

In the absence of the foregoing technique, Host 102 typically would reserve multiple data pages for storage of successive versions of each of the linked pages, then alternate in the use of the pages. Host 102 is then required to perform additional data page reads at the start of a transaction to discern which of the linked data pages are the most current versions and additional data page writes to update the currency information. The use of temporary buffers in Tag 106 is made practical by the speed at which the FRAM data memory of Tag 106 may be written. If Tag 106 were implemented with a memory technology with a relative long write time, such as EEPROM, the use of temporary buffers in Tag 106 would add substantial delays to every "writepage" command processed.

Message Authentication

Five of the six message types exchanged between Tag 106 and Host 102 ("imawake," "readpage," "sendingpage," "writepage," and "ack") end with a message authentication code (MAC), which performs two functions. Any size of MAC can be used depending upon the security required. In the preferred embodiment, the MAC is a six byte value computed from the preceding message content, the two random numbers (from the "wakeup" and "imawake" messages exchanged during collision resolution), the appropriate secret key (except in the "imawake" message), and a message sequence number. The properties of the MAC computation result in a MAC value that will, statistically, change half of its bits if one bit of any of the input bits is changed. Due to this property, the MAC is used both to check for transmission errors and to check for message authenticity.

An incorrect MAC can be due to either corruption of message bits during transmission from sender to receiver or due to sender and receiver not supplying the same data to the MAC computation algorithm. If an incorrect MAC is received due to corruption of message bits during transrmission, a retry of the failed exchange will result in a correct MAC. If an incorrect MAC is received due to the sender or receiver not providing the correct inputs to the MAC computation algorithm, all retries of the failed exchange will continue to fail. Host 102 can therefore deduce the cause of a MAC failure by retrying the failed operation enough times to rule out transmission error as the cause of the problem. If an incorrect MAC is received due to the sender or receiver not providing the correct inputs to the MAC computation algorithm, all retries of the failed exchange will continue to fail.

Tag Protocol Implementation

Figure 7B:
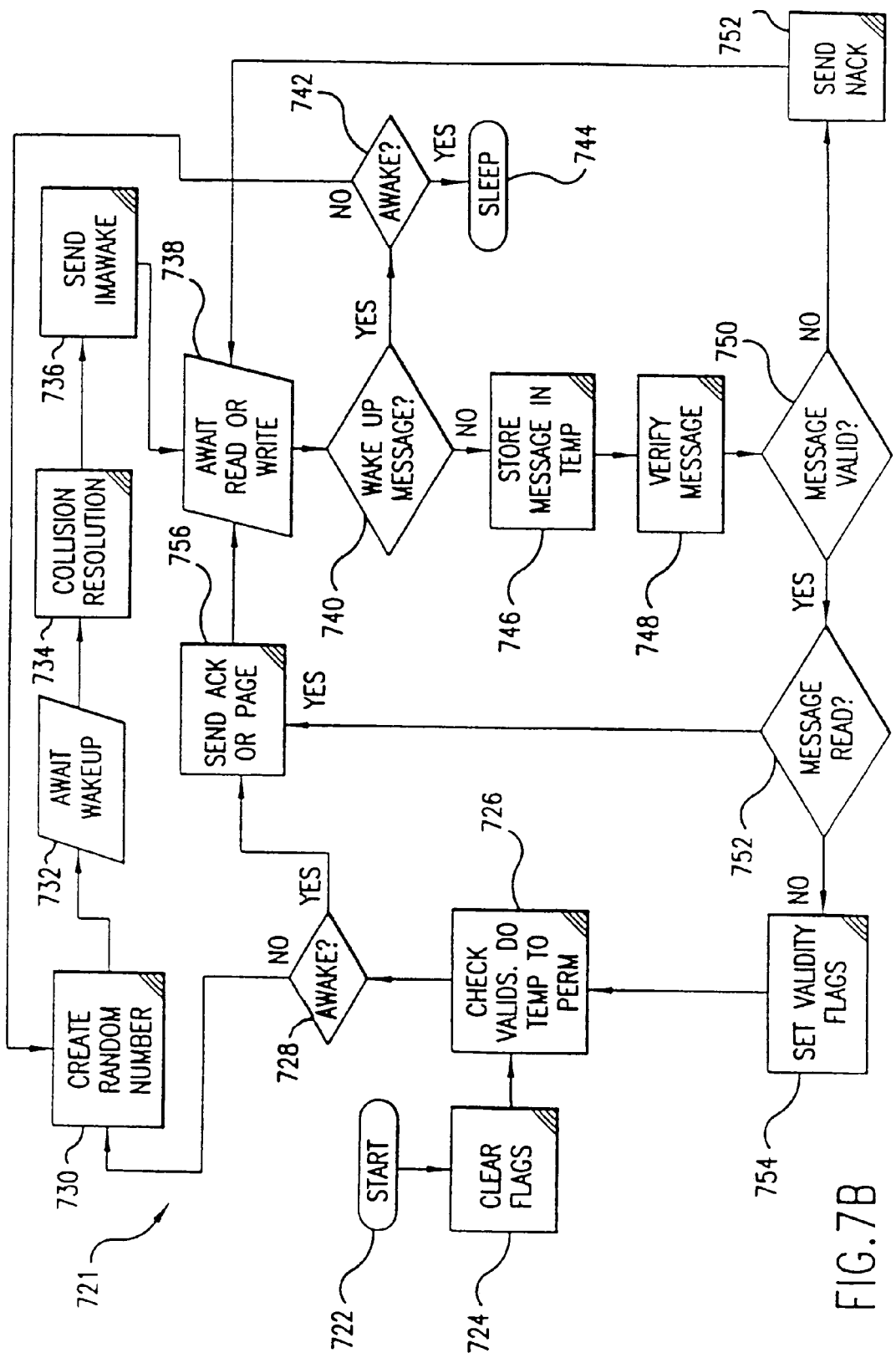
FIG. 7B is a flow diagram illustrating a high level control of a Tag.

From the foregoing, it can be appreciated that the invention also constitutes a protocol for providing contactless proximity automated data collection. FIG. 7B shows a flow diagram illustrating the Tag's side of a protocol 721 in accordance with the principles of the invention.

In this preferred embodiment, upon release of the reset, the Tag clears its flags (step 724), checks for and completes any valid but uncompleted writes to Tag memory (step 726), checks whether it has received a "wakeup" message (step 728) (it has not) and proceeds to begin the wakeup procedure.

For this procedure, Tag 106 chooses a random number (step 730) and awaits a valid "wakeup" message from the Target (step 732). A "wakeup" message is deemed valid if both copies of the Target random number sent in "wakeup" match. If the "wakeup" was invalid, Tag 106 continues to wait until a valid "wakeup" is received.

Following reception of a good "wakeup," Tag 106 resolves any collisions in the RF channel (step 734) by methods previously explained. Assuming Tag 106 has won any collision resolution, Tag 106 sends an "imawake" message (step 736). At this point, Tag 106 is ready to receive authenticated read or write messages from the Target (step 738).

Tag 106 receives the next message from Target 104. Tag 106 checks if the message is a "wakeup" (step 740). If it is, Tag 106 assumes that Target 104 is trying to communicate with a different Tag. If Target 104 has not yet done a successful read or write to Tag 106 (step 742), Tag 106 participates again in the wakeup procedure Otherwise, Tag 106 goes to sleep to avoid blocking the communication channel (step 744).

Assuming the message is a "readpage" or "writepage," Tag 106 stores the full message in scratch non-volatile memory (step 746). Tag 106 calculates its own MAC and compares it to the MAC of the message (step 748). This result is checked (step 750). If the message contained a bad MAC, a Nak message is sent to Target 104 (step 752) and Tag 106 goes back to waiting for a message from Target 104 (step 738).

If the MAC is valid, the awake flag is set, the sequence number is incremented, and the message is checked for whether it is a "readpage" or "writepage" (step 752). If a "writepage," a validity flag is set (step 754) according to the conventions of the multi-page write capability described earlier. Next this flag is checked (step 726) and the write completed if necessary. Then the awake flag is checked (728). Because Tag 106 is now awake, control passes to the Send Ack or Page (step 756) where an acknowledge signal is sent to Target 104 and control passes to wait for another message (step 738).

If the message was a "readpage" (step 752), the writepage loop is skipped and control goes to the Send Ack or Page (step 756) where the requested page is sent to Target 104. Control then passes to Host 102 while Tag 106 waits for another message (step 738).

Tag Detailed Description

Tag Overview

The architecture of Tag 106, particularly Tag ASIC 302, is instrumental in realizing many of the overall advantages of the invention. That is, Tag 106 communication protocol and hardware/software implementation have been specifically designed for fast transaction rates, low power consumption, improved security, and ensured data integrity, while providing application flexibility. In addition, the Tag's compact circuitry advantageously leads to a low profile.

As discussed with reference to FIG. 4, Tag 106 includes Tag ASIC 302 and antenna 300. In this embodiment, Tag ASIC 302 was designed using a full-custom design methodology to implement the specific circuit features discussed below. That is, each feature was implemented using very large scale integration (VLSI) polygons to define the requisite operation of each circuit separately and in such a way as to optimize the area of each circuit. Circuit interconnections were also minimized through custom placement and routing.

Figure 8:
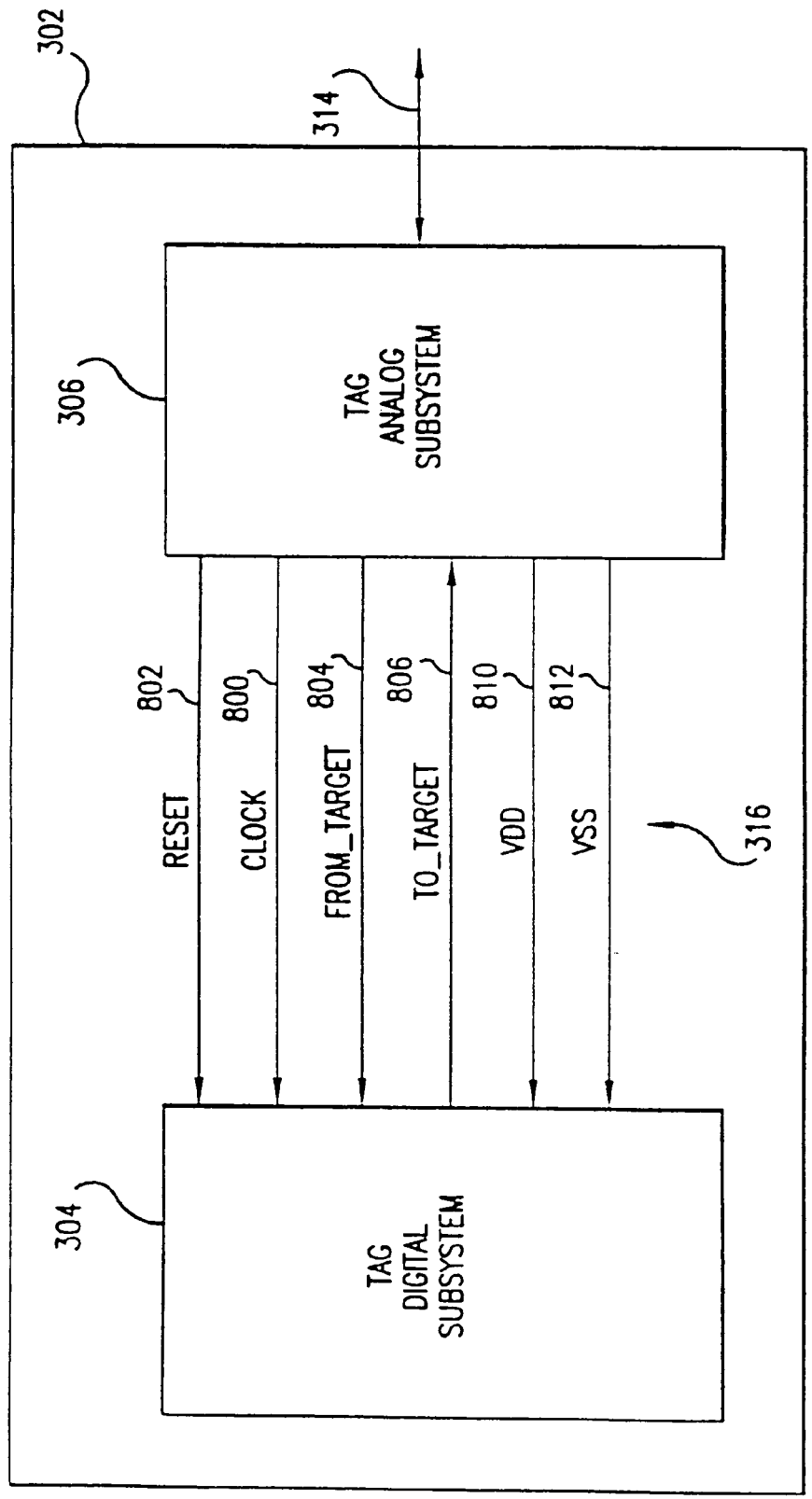
FIG. 8 is a detailed signal diagram for the interface between a Tag analog subsystem and a Tag digital subsystem.

As indicated above, Tag ASIC 302 is partitioned into digital subsystem 304 and analog subsystem 306. FIG. 8 illustrates signal interconnection (interface) 316, between digital subsystem 304 and analog subsystem 306 in greater detail. Interface 316 includes clock signal 800, a reset signal 802, a from_target signal 804, and a to_target signal 806. $V_{DD}$ 810 and $V_{SS}$ 812 are also provided by analog system 306 for power (i.e., 5 volts for this embodiment) and ground, respectively.

Clock 800 is derived by analog subsystem 306 from the RF signals received over interconnection 314 and is used to drive the digital logic of digital subsystem 304. In this embodiment, clock 800 is derived from the carrier frequency of 13.56 MHz.

Reset 802 is also controlled by analog subsystem 306. Reset 802 is asserted at power-up and de-asserts once the RF power conditions are suitable for communication with Target 104.

From_target 804 and to_target 806 signals convey the Target and Tag message/data, respectively. In the preferred embodiment, the normal (marking) state is a binary "1" for from$_{13}$ target signal 804.

Tag Digital Subsystem

Digital subsystem 304 is particularly optimized in terms of transaction speed, chip area, power consumption, data integrity, security, and cost. In general, digital subsystem 304 utilizes serial techniques to transfer (move) messages/ data throughout digital subsystem 304 to realize significant savings in chip area. While such an approach generally requires longer transfer and process times than a bit parallel approach, the invention provides a dual speed clocking feature (discussed below) for compensation.

Figure 9:
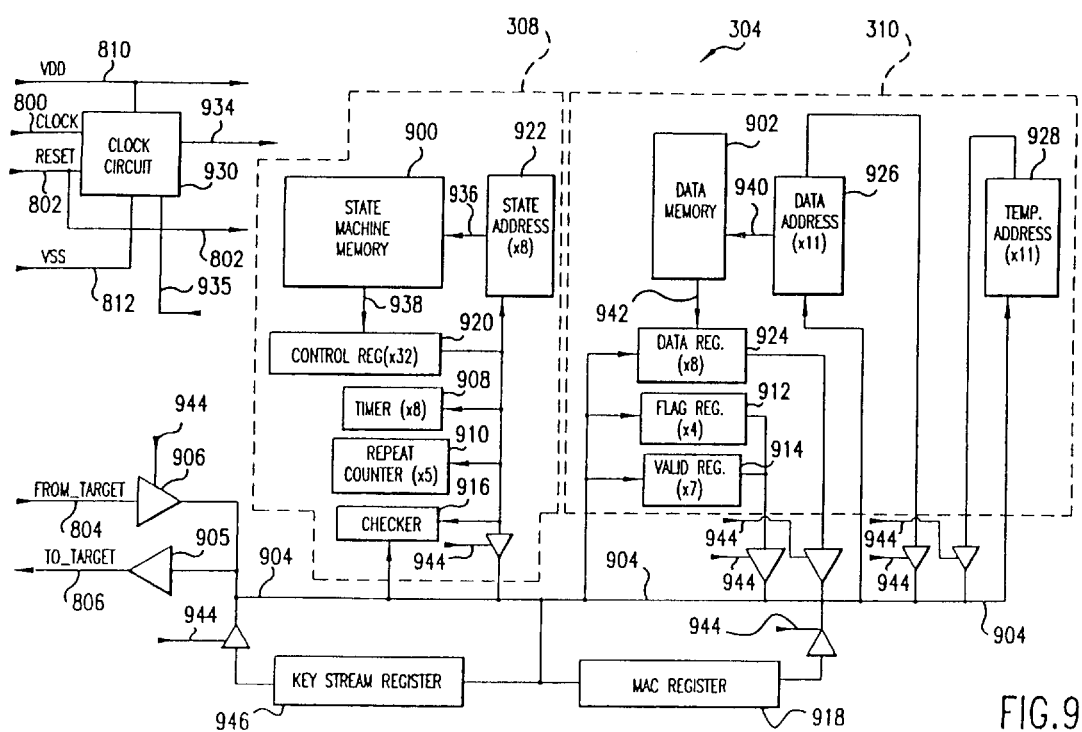
FIG. 9 is a block diagram of a Tag digital subsystem.

FIG. 9 is a detailed schematic diagram of digital subsystem 304. Digital subsystem 304 includes a state machine memory 900, a data memory 902 operably interconnected via a 1-bit bus 904 to a transmitter 905, a receiver 906, a flag register 912, a validity register 914, a checker circuit 916, a message authentication code (MAC) register 918, and a key stream register 946. Bus 904 is used to transfer information (messages/data) throughout digital subsystem 304. Digital subsytem 304 also includes a clock circuit 930.

State machine memory 900 provides the overall control for Tag 106. As is well known, a finite-state machine is generally a circuit whose outputs at any given time are a function of external inputs (typically stimuli from circuits being controlled by the state machine or other inputs), as well as of the stored information at that time (or its state). State machines have been conventionally implemented with discrete digital circuits, programmable logic arrays (PLA), and general purpose microprocessors with program memory.

In this embodiment, however, state machine memory 900 is primarily implemented as a predetermined lookup table stored in read only memory (ROM) to further optimize chip area utilization. As such, each ROM address is a "state" of the machine, and the data stored at the addressed (indexed) location defines the corresponding outputs. Additionally, because ROMs are sexed (asymmetrical for power consumption and speed purposes where either ones or zeros are the preferred state), this preferred embodiment was optimized to only 19.85% binary ones within the state machine. Alternatively, state machine memory 900 can be implemented in other well known nonvolatile memory technologies such as programmable read only memory (FROM), erasable programmable read only memory (EPROM), and ferroelectric random access memory (FRAM), etc.

In this embodiment, state machine memory 900 is implemented as a 256×32-bit (4 bytes) ROM and is addressed by an 8-bit state address register 922 by an 8-bit connection 936. State machine memory 900 outputs to a 32-bit connection 938 operably connected to a 32-bit control register 920. As would be apparent to one skilled in the relevant art, varies sized ROMs, buses, and registers can be utilized in accordance with the invention.

Another feature of the invention is that state address register 922 is implemented as a linear feedback shift register (LFSR) circuit. The addressing functionality of state machine memory 900 is thus achieved with less chip area and cost than a conventional incrementer (counter). In addition, the critical path of the resulting circuit is reduced by an order of magnitude over such conventional circuits.

In general, an LFSR is a n-bit right-shifting register with taps at m of the n bit locations. These bit locations are identified as position "0" being the least significant bit (LSB) of the address and n−1 being the most significant bit (MSB). At the beginning of a clock cycle (i.e., clock signal 934), all of the taps input to a m-way exclusive-nor (XNOR) circuit. At the next corresponding clock cycle, the output of the XNOR circuit is shifted into the n−1 bit location. In operation, if initialized correctly, the LFSR will generate a repeating sequence of bit patterns, the period of which is dependent upon n, m, and the location of the taps.

Figure 10:
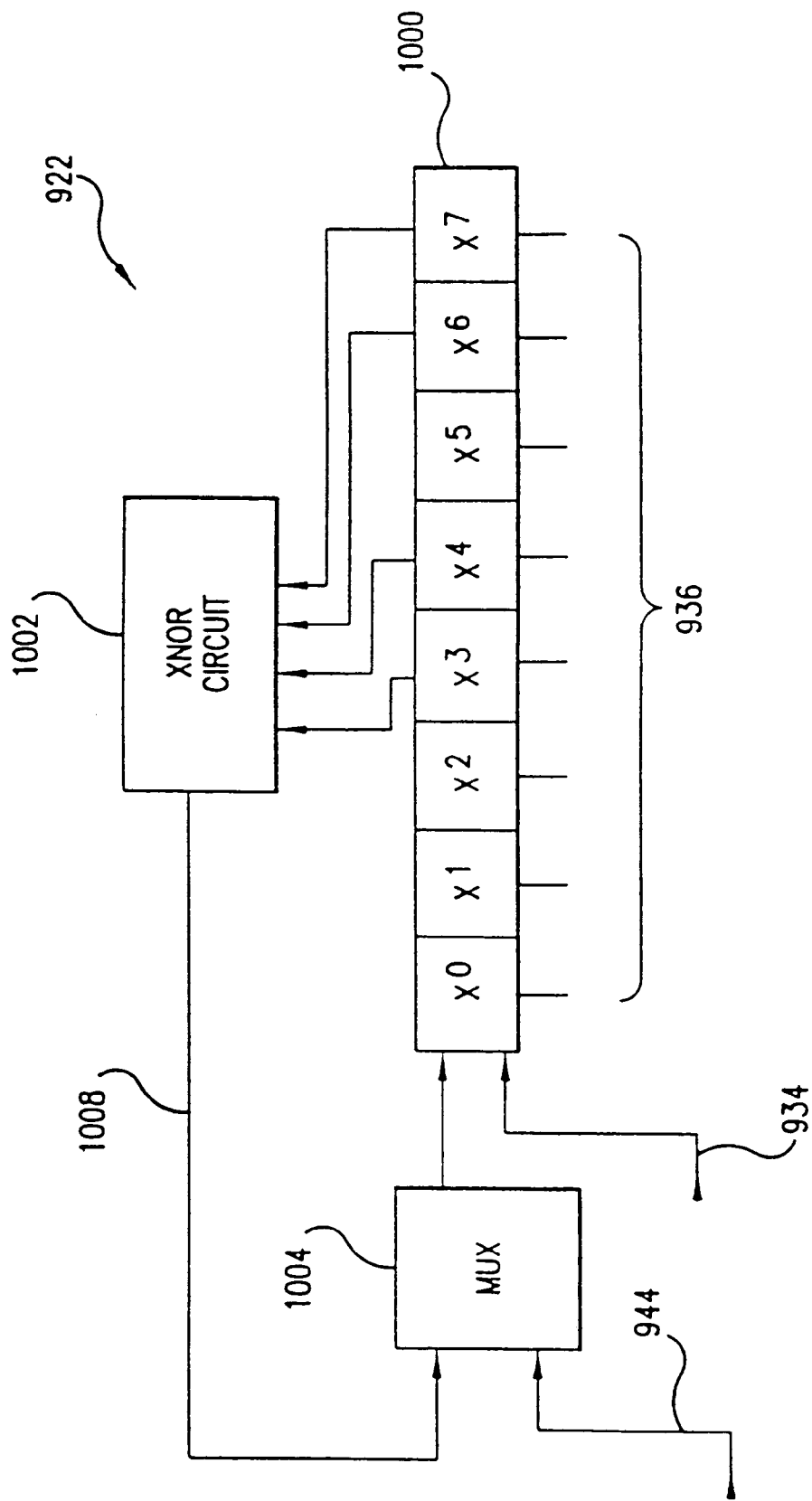
FIG. 10 illustrates a detailed schematic diagram of a state address register.

FIG. 10 illustrates a detailed schematic diagram of state address register 922, which includes an LFSR 1000, an XNOR circuit 1002, and a two-to-one multiplexor (MUX) 1004. In this embodiment, an 8-bit (n=8) LFSR with 4 taps (m=4) is used. Mux 1004 receives input from signal 944 driven by state machine memory 900 (Ivalue field 1120, discussed below) or XNOR circuit 1002 via a feedback signal 1008. Feedback signal 1008 is determined as the inverse of the parity of the values in specific positions in state address register 922.

In operation state address register 922, once initialized (to state "00000000"), will cycle through all possible 8-bit values except one ("11111111"). This extra state is used as a "sleep" state. When the state address register 922 is in the sleep state it will always step back to the sleep state.

With reference to FIG. 9, the contents of each addressed (indexed) location of state machine memory 900 is a 32-bit very long instruction word (VLIW) that is loaded into control register 920 via connection 938. In this embodiment, the overall control of Tag 106 is achieved using only 256 32-bit state instructions.

Figure 11:
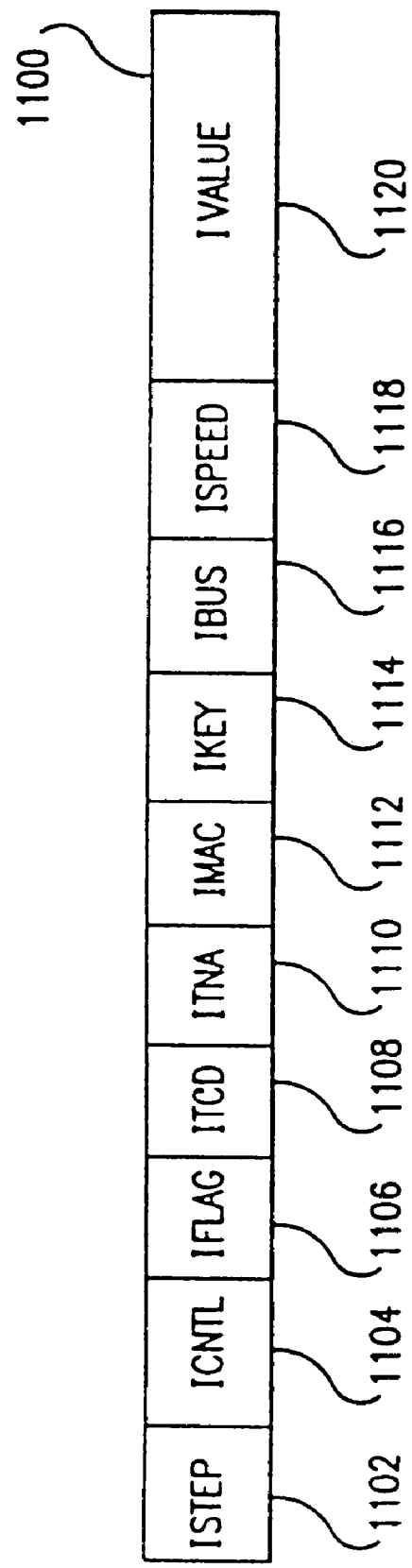
FIG. 11 illustrates a very long instruction word (VLIW).

FIG. 11 illustrates a state instruction word 1100 in accordance with invention. State instruction word 1100 is partitioned into distinct instruction fields including Istep 1102, Icntl 1104, Iflag 1106, Itcd 1108, Itna 1110, Imac 1112, Ikey 1114, Ibus 1116, Ispeed 1118, and Ivalue 1120. Each field controls one or more circuits (i.e, registers and bus drivers) of digital subsystem 304. Table 2 summarizes the general function of each field of instruction word 1100.

TABLE 2

| Instruction Mnemonic | Field | Function |
| --- | --- | --- |
| Istep | 1102 | Controls counter register 916 (this value indicates the number of bits operated upon with each instruction). |
| Icntl | 1104 | Controls dataflow in address register 922, and hence addressing of state machine memory 900. |
| Iflag | 1106 | Controls the operation of flag register 912 and validity register 914. |

TABLE 2-continued

| Instruction Mnemonic | Field | Function |
| --- | --- | --- |
| Itcd | 1108 | Controls the operation of timer register 908, repeat counter register 916, and data register 924. |
| Itna | 1110 | Controls data address register 926 and temporary address 928 register. |
| Imac | 1112 | Controls MAC register 918. |
| Ikey | 1114 | Controls key stream generator register 946. |
| Ibus | 1116 | Controls access to/from bus 904. |
| Ispeed | 1118 | Controls clock circuit 930. |
| Ivalue | 1120 | Contains constants that can be serially loaded into timer register 908, repeat counter register 910, state address register 922, or bus 904. |

In general, each instruction, word 1100 is executed in three phases. First, requisite data movements are made among the registers (including state address register 922 and data address register 926). If required, data memory 902 and/or state machine memory 900 are accessed. Any data from data memory 902 or state machine memory 900 is then latched into data register 924 or control register 920, respechvely.

The operation of digital subsystem 304 is now discussed with reference to instruction 1100. With respect to state machine memory 900, indexing is provided by state address register 922 and Icntl 1104. Table 3 illustrates the values of the Icntl field 1104 and their effect primarily on the next access of state machine memory 900.

State address register 922 normally increments in accordance with its predetermined LFSR pattern (as discussed above). When a branch condition occurs, however, a new 8-bit address, from Ivalue 1120, is serially loaded (requiring eight steps or clock cycles). Conditional branches are based upon data values or events, such as a time-out condition or a loop expiration. As will be discussed below, checker circuit 916, timer register 908, and counter register 910 are used in conjunction with conditional branching.

TABLE 3

| Icntl Mnemonic | Effect |
| --- | --- |
| null | State address register 922 shifts in accordance with its predetermined LFSR (no branch). |
| ball | Ivalue 1120 (new address) is loaded into state address register 922 (unconditional branch). |
| btrue | If checker 916 was true does ball, otherwise does null (true condition branch). |
| bfalse | If checker 916 was false does ball, otherwise does null (false condition branch). |
| bcount | If counter register 910 has value "00000" does ball, otherwise does null (counter expiration branch). |
| btime | If timer register 908 has expired does ball, otherwise does null (time-out branch). |
| ltime | Loads timer register 908 with Ivalue 1120 and acts as null in other respects. |
| getedge | Suspends Tag 106 until either falling edge of start bit of message/data received from Target 104 or expiration of timer register 908, then acts as null. |

As illustrated in FIG. 9, clock circuit 930 generates a system clock 934, which is operably interconnected with all digital subsystem 304 registers and other clocked circuitry. Clock circuit 930 is controlled by Ispeed 1118 which is received over interconnection 935.

In this embodiment of the invention, clock circuit 930 provides a dual speed clocking feature. Clock circuit 930 receives clock signal 800 (13.56 MHz) from analog subsystem 306 and generates system clock signal 934 with a frequency of 1.7 MHz (fast clock mode) or a frequency of 115.2 KHz (slow clock mode) in accordance with particular operation of digital subsystem 304. However, other clock rates can be used with the invention.

Fast mode (Ispeed 1118="0") is normally used for all instruction words 1100 execution and processing other than conducting communications with Target 104. As such, 1.7 million state instructions 1100 are executed per second (assuming Istep 1102=1).

Slow mode (Ispeed 1118="1") is used for data communication between Target 104 and Tag 106. That is, digital subsystem 304 operates at the same transmission rate as the 115.2 Kbps data communication rate between Target 104 and Tag 106. Accordingly, data can be transferred to/from Tag 106 with the identical circuitry as normally used in the fast mode. This dual speed clocking feature further eliminates the need for special purpose circuitry, such as a conventional universal asynchronous receiver transmitter (UART).

A related feature of the invention is the getedge field (see Table 3) of instruction word 1100. The getedge field, in conjunction with timer register 908, suspends operation of digital subsystem 304 until a falling edge is received from the start bit of each asynchronous incoming byte (from Target 104). Digital subsystem 304 can thus synchronize itself to each incoming byte. For transrrussion, digital subsystem 304 sends a start bit, message byte (serially), and all stop bits required for communications of each transmitted byte. Timer register 908 runs even throughout the suspension of state machine memory 900 and causes an associated time-out event if no edge is detected. Timer register 908 is an LFSR-based down counter.

Checker circuit .916 serially compares data value on bus 904 with Ivalue 1120 and stores the resulting condition for branching on the next state instruction word 1100.

Repeat counter register 910 is a down counter used to control loop execution (one level of nesting). In this embodiment, repeat counter register 910, like state address register 922 and timer register 908, is implemented as a LFSR. Repeat counter register 910 can be both decremented and checked explicitly by state machine memory 900 for branch control.

In operation, Istep 1102 controls how many bits are operated upon with each state instruction word 1100. With each instruction word 1100 access, the 5-bit value of Istep 1102 is loaded from the state machine memory 900 (via control register 920). With each subsequent clock cycle, this value is LFSR-shifted to another value. Upon reaching a predetermined value, the next state instruction word 1100 is fetched. Istep 1102 can effect from 1 to 31 steps thus causing the machine to execute a given instruction word 1100 up to 31 times.

As illustrated in FIG. 9, bus 904 has eight bus drivers. Each bus driver is associated with a source (e.g., control register 920, data register 924, receiver 906, etc.) For proper operation, only one bus driver, at any given time, is enabled by its respective driver_enable signal 944. State instruction word 1100 the corresponding Ibus 1116 field determines which bus driver is enabled. As would be apparent to one skilled in the relevant art, driver_enable signals 944 can be generated by an appropriate address decoder circuit implemented in combinatorial logic or a conventional 1-out-of-8 decoder functionally similar to the commercially available Intel® 8205 decoder.

The following is an example of a typical data flow. When eight bits from data register 924 are to be copied (not moved) to temporary address register 928, the Ibus 1116 field specifies that data register 924 will drive bus 904. Concurrently, field Itcd 1108 also specifies that data register 924 loads from bus 904 (thus data will cycle out of data register 924 and back around into data register 924 to restore the value that was just shifted out). Itna 1110 field is also loaded into temporary address register 928 with data (from data register 924) on bus 904.

The operation of a digital subsytem 304 often depends upon process status (or flags). In this embodiment, the process status system occupies the data path for operational flexibility and efficiency. There are two registers dedicated to process status, flag register 912 and validity register 914. Flag register 912 is used for general purpose status (e.g., true or false conditions) and validity register 914 for application specific status.

Data memory 902 is the nonvolatile storage area for application data (e.g., passenger fare data, image data, medical records, etc.). In this embodiment, data memory 902 is implemented with a 2048×8-bit (1 byte) FRAM interfaced with 11-bit data address register 926 and 8-bit data register 924 via interconnections 940 and 942, respectively. The contents of data register 924 are loaded from/to data memory 902 for read/write operations, respectively. Data memory 902 is controlled by field Itna 1110, which controls the operation of both data address register 926 and temporary address register 928.

Figure 12:
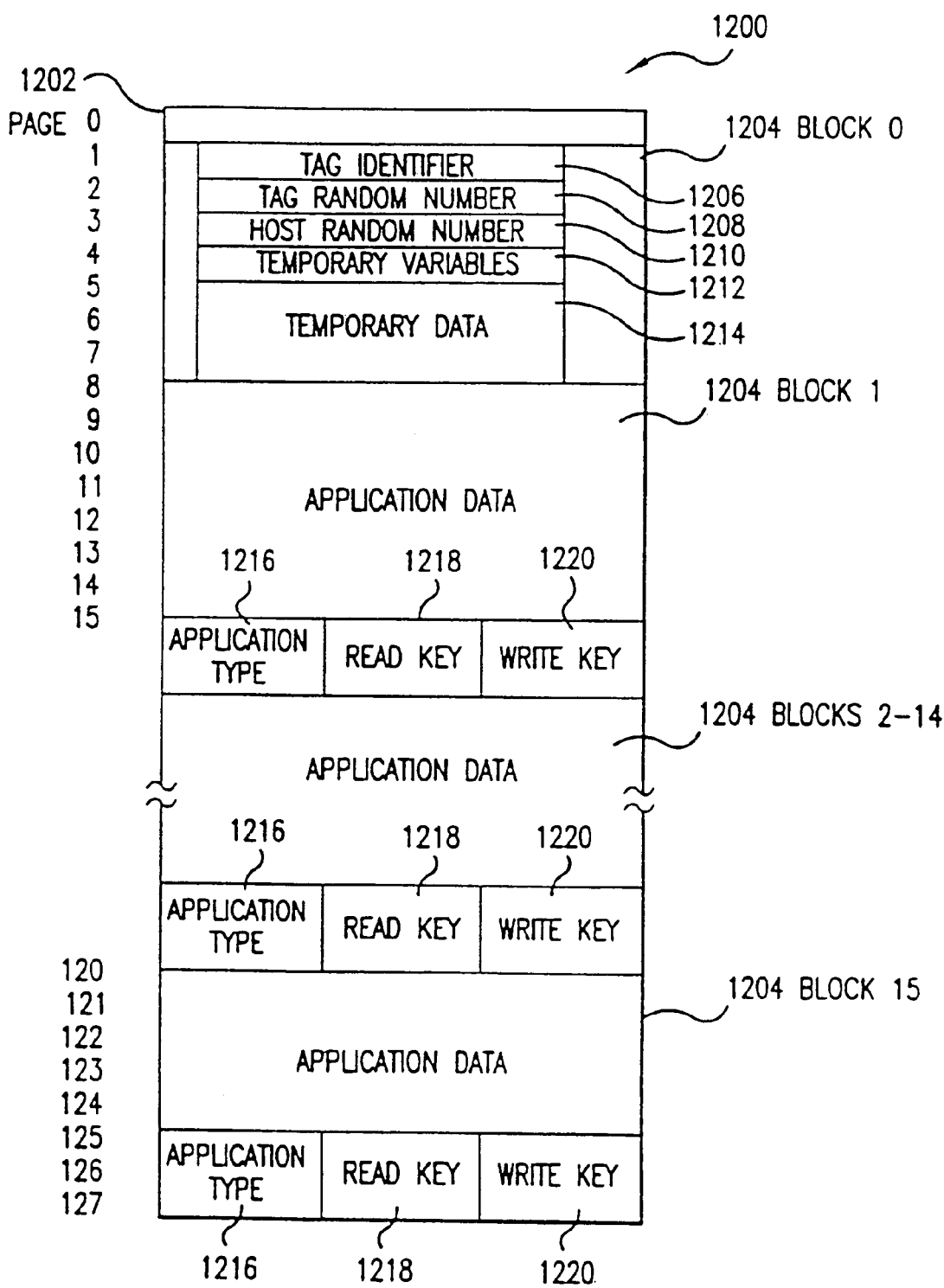
FIG. 12 illustrates a memory map of a data memory.

FIG. 12 illustrates a memory map 1200 for data memory 902 for independent multi-purse transit applications. The memory is organized into 128 16-byte pages 1202 (Pages "0"–"127"). In operation, Host 102 (via Target 104) facilitates transfers to/from data memory 902 on a page basis (i.e., a page is the smallest unit of memory accessed by Host 102). Pages 1202 are further organized into 16 blocks 1204 (Blocks "0"–"15"). Each block 1204 consists of eight pages 1202.

In this embodiment, block "0" 1204 (Pages "0"–"7") is reserved for Tag 106 internal use only. In particular, block "0" 1204 includes a Tag identifier buffer 1206, a Tag random number buffer 1208, a Host random number buffer 1210, a temporary variables buffer 1212, and a temporary data buffer 1214. Temporary data buffer 1214 consists of four pages 1202 to accommodate the MAC and header data.

The remaining 15 blocks 1204 (Blocks "1"–"15") are available for storage of data by the applications running on Host 102. For each block 1204, one page 1202 is reserved, which includes an application type buffer 1216, a read key 1218, and a write key buffer 1220. The secret keys, stored in buffers 1218 and 1220, are needed to read or write the other seven data pages 1202 of the same block 1204. The significance of each of these elements is discussed above.

Data integrity and security is further enhanced with the message authentication features of the invention. For each transaction, Host 102 and Tag 106 must authenticate each other in a given transaction. In this embodiment, message authentication code (MAC) register 918 is controlled by field Imac 1112 and the keystream generator 946 is controlled by field Ikey 1114. Together, these registers are utilized to create/check the authentication MACs that pass back and forth during a transaction.

Tag Analog Subsystem

Figure 13:
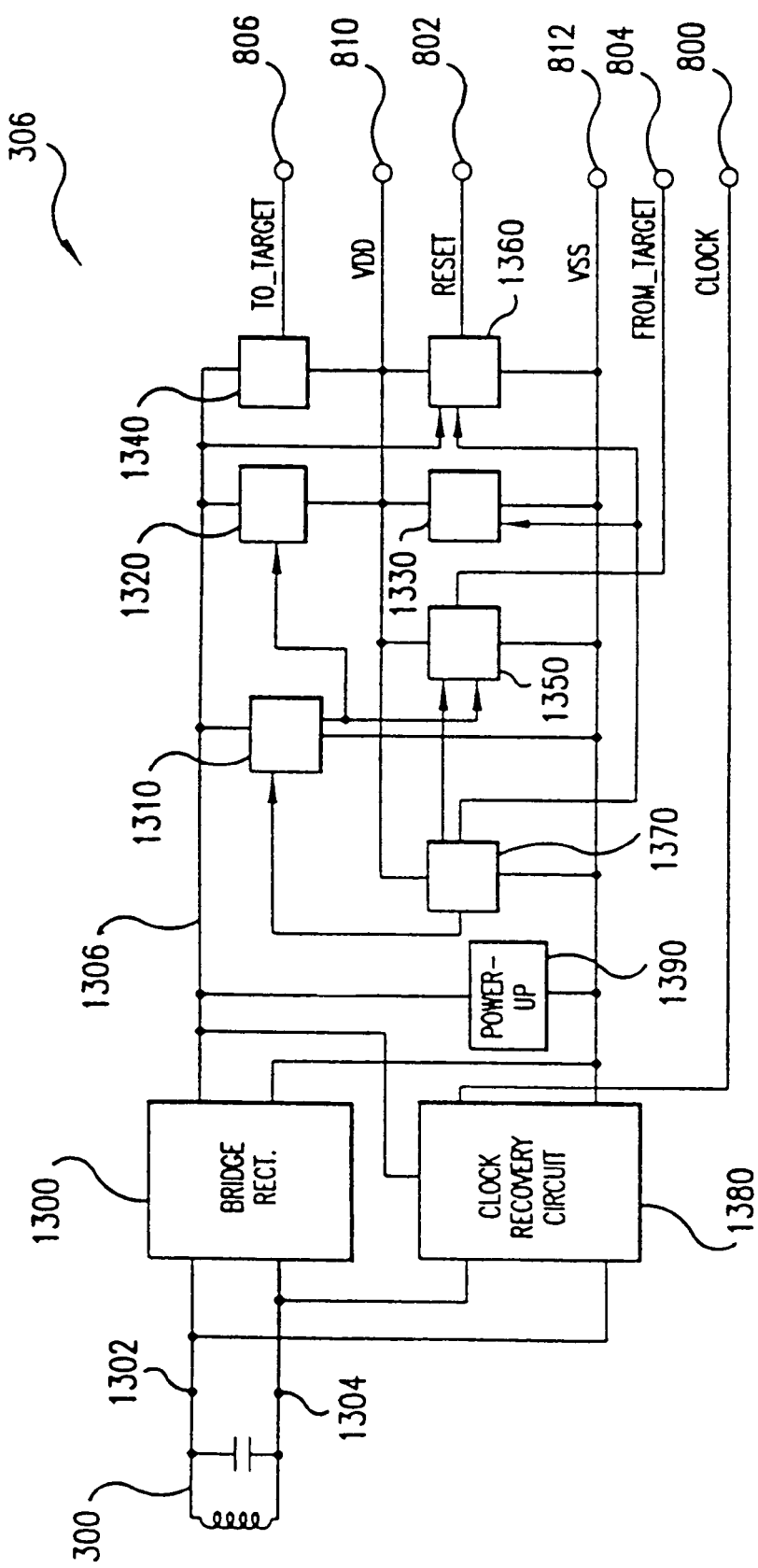
FIG. 13 is a detailed block diagram of a Tag analog subsystem.
Figure 14A:
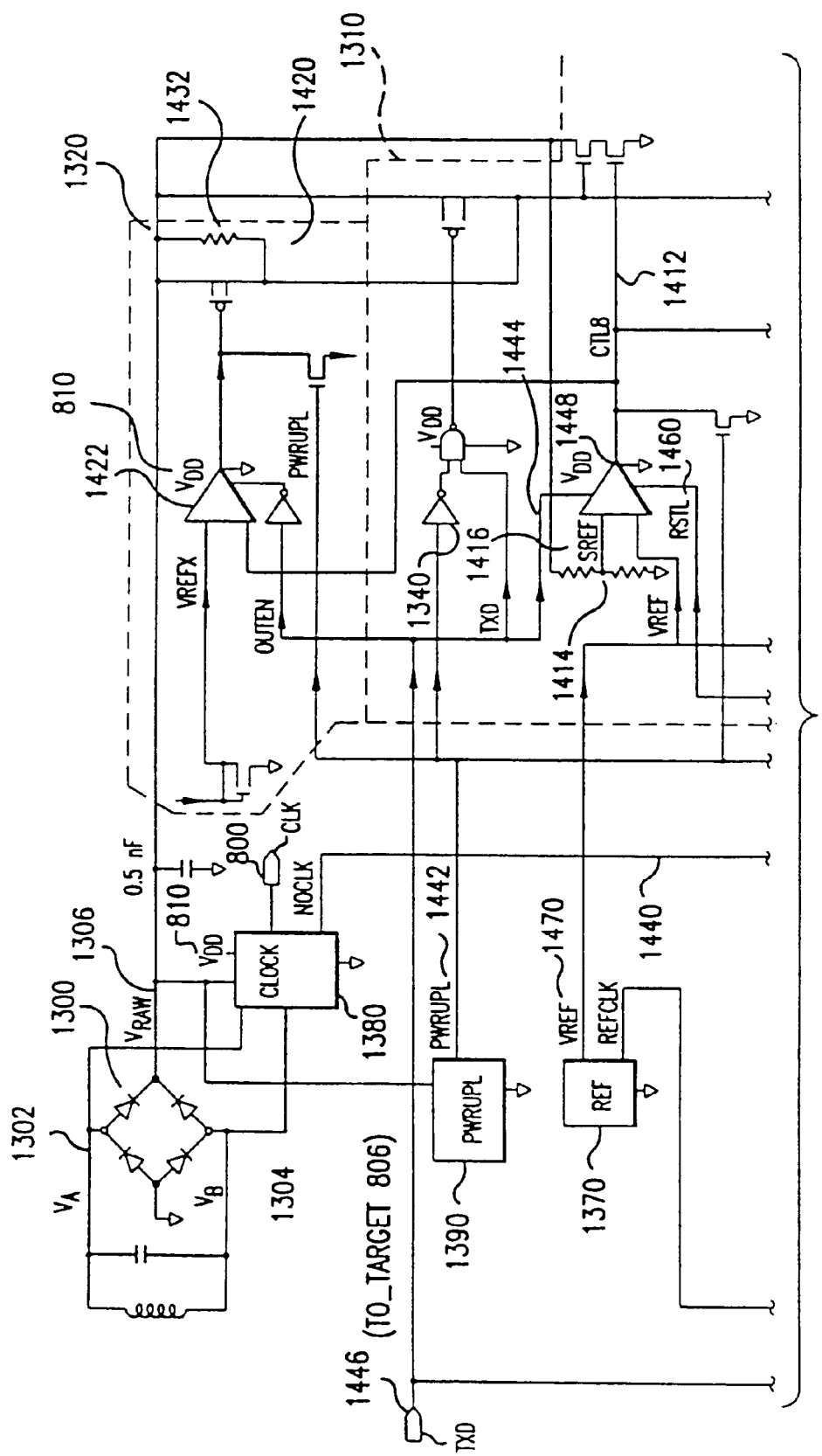
FIG. 14 is a detailed schematic diagram of a Tag analog subsystem.
Figure 14B:
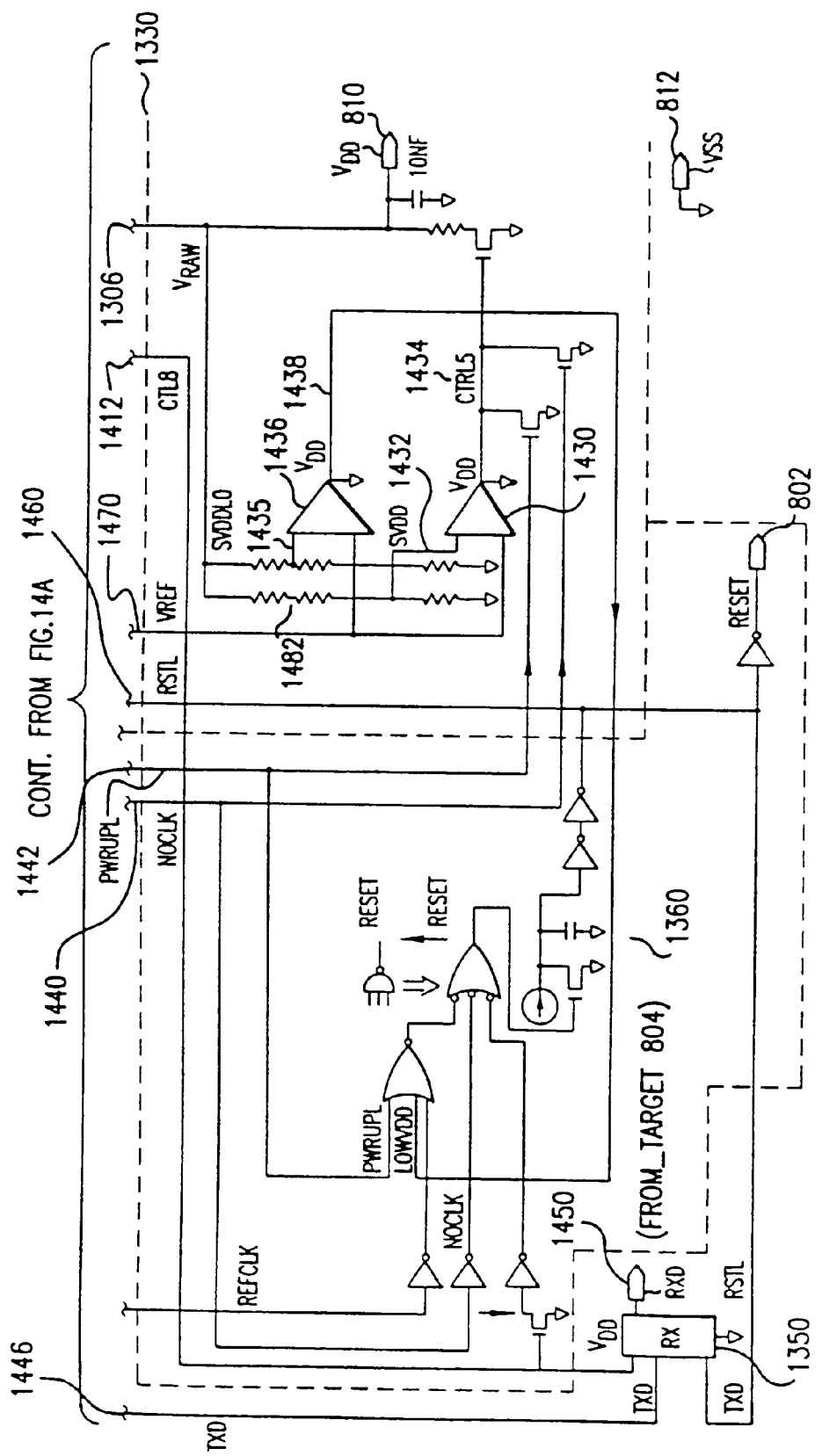

Analog subsystem 306 contains the power supply circuitry and RF communication mechanisms for Tag ASIC 302. FIGS. 13 and 14 illustrate a detailed block diagram and a detailed schematic of analog subsystem 306, respectively.

In general, analog subsystem 306 generates a 5V supply for digital subsystem 304 and analog subsystem 306, generates a 13.56 MHz clock signal (clock signal 800) from RF signal 110 (from Target 104), demodulates incoming AM messages/data on RF signal 110 and passes the data in bit-serial form to digital subsystem 304 (digital subsystem 304 performs all data framing and other processing of the data), modulates data from digital subsystem 304 onto RF carrier signal 112 using impedance modulation techniques, and generates reset signal 802 to ensure correct start-up and shut-down operation of digital subsystem 304 and analog subsystem 306.

With reference to FIG. 13, analog subsystem 306 includes an antenna 300, a full wave bridge rectifier 1300, a clock recovery circuit 1380, a power-up circuit 1390, an 8V shunt regulator (shunt8) 1310, a series regulator 1320, a 5V shunt regulator (shunt5) 1330, a transmitter 1340, a receiver 1350, a reset generator 1360, and a reference generator 1370.

Antenna 300 receives energy from RF field 110 (from Target 104) and transmits two signals $V_a$ 1302 and $V_b$ 1304 to bridge rectifier 1300 and clock recovery circuit 1380. Full wave bridge rectifier 1300 receives AC input signals, $V_a$ 1302 and $V_b$ 1304, from antenna 300 and generates a DC output voltage ($V_{raw}$ 1306) to power Tag 106. Rectifier 1300 also connects to $V_{ss}$ 812.

Clock recovery circuit 1380 also monitors $V_a$ 1302 and $V_b$ 1304 and generates clock 800 (13.56 MHz) which is an input to digital subsystem 304. As is well known in the relevant art, various logical gate circuits can be used to implement clock recovery circuit 1380. This preferred embodiment uses a cross coupled NOR latch circuit for click recovery and prevention of short clock pulses. Clock recovery circuit 1380 also provides a noclk 1440 signal (missing carrier signal) for use by reset generator 1360. Noclk 1440 is generated using a retriggerable one shot, which is one of many methods known by those skilled in the art.

Reference generator 1370 (a bandgap voltage reference) produces a $V_{REF}$ signal 1470 as well as reference currents for other analog circuits of analog subsytem 306. In operation, Tag ASIC 302 is held in a reset state until $V_{REF}$ 1470 has stabilized.

Power-up circuit 1390 ensures that regulators 1310, 1320, and 1330 do not start operating before $V_{REF}$ 1470 has reached approximately its final value. If regulators 1310, 1320, and 1330 start shunting early, it is possible that $V_{DD}$ 810 might be held to a voltage at which $V_{REF}$ 1470 cannot rise to its true value. It would then be possible to achieve a stable state where $V_{DD}$ 810 is held to a low voltage at which point the chip would not function. Power-up circuit 1390 prevents this from happening.

Power-up circuit 1390, during power-up, disables regulators 1310, 1320, and 1330 and shorts the DC input voltage, $V_{RAW}$ 1306, to $V_{DD}$ 810 until $V_{RAW}$ 1306 has reached approximately the power-up threshold voltage. This ensures that $V_{DD}$ 810 is charged as fast as possible, so that $V_{REF}$ 1470 stabilizes before the regulator control loops are enabled. Digital subsystem 304 is held in a reset state when $V_{RAW}$ 1306 is below the power-up threshold voltage. If $V_{RAW}$ 1306 exceeds the power-up threshold voltage, an output signal, pwrupl 1442, is de-asserted (active low).

Once $V_{REF}$ 1470 stabilizes, $V_{RAW}$ 1306 rises to a voltage near the breakdown voltage of ASIC 302 The invention thus provides as wide a modulation voltage step as possible for message/data transmission, because it operates reliably near the breakdown voltage of Tag ASIC 302. This embodiment of the invention creates the wide step using transmitter 1340.

The 8V shunt regulator (Shunt8 1310) detects incoming messages/data and protects the Tag ASIC 302 from short term over-voltage transients. Fabricated silicon devices, such as Tag ASIC 302, inherently have breakdown voltages. Accordingly, it is necessary that the operating voltage kept from exceeding the Tag ASIC 302 breakdown voltage while receiving AM signals from Target 104.

A well known clamping device designed to allow slow amplitude variations can be placed across Tag 106 antenna to overcome voltage breakdown problems. This solution, however, assumes that Tag 106 enters RF field (RF signal 110) of Target 104 at a slow enough rate so that the slow-responding clamp circuit can effectively respond. This is usually true if a person is holding Tag 106 and moving it into Target 104's RF field.

There are, however, other applications where it is advantageous to have Tag 106 mechanically positioned at a fixed location near Target 104 and where its RF field 110 is electrically switched on and off ("pulsed RF"). In such instances, RF field 110 changes much faster than the slow clamp circuit can effectively respond, and an ASIC (such as Tag ASIC 302) can experience over-voltage and latch-up. While this is unlikely to permanently damage, it can keep Tag 106 from operating in the desired pulsed RF scheme.

In order to overcome this voltage breakdown problem, as well as providing other benefits, the invention teaches the use of shunt8 1310. Shunt8 1310 removes AM voltage fluctuations and is fast enough to react to switched/pulsed RF. Shunt8 1310 also removes the AM voltage fluctuation from the rectified carrier.

A second benefit of shunt8 1310 is that the clamping voltage can be accurately determined and adjusted slightly below the ASIC breakdown voltage, allowing for a smaller Tag ASIC 302 with lower breakdown processes.

More specifically, shunt8 1310 operates as follows in this embodiment. When Tag 106 is not transmitting messages/data, shunt8 1310 regulates $V_{RAW}$ 1306 to 8V. In so doing, shunt8 1310 generates a ctl8 1412 signal (shunt8 control voltage) by dividing $V_{RAW}$ 1306 with a resistive divider 1414 and generating a $S_{REF}$ 1416 signal. A data recovery comparator 1418 (a transconductance amplifier) compares $S_{REF}$ 1416 with reference voltage $V_{REF}$ 1470 (nominally 1.25V) and outputs ctl8 1412. If $S_{REF}$ 1416 is greater than $V_{REF}$ 1470, ctl8 1412 increases, thereby causing more current to flow through shunt8 1310 and, in turn, causes $V_{RAW}$ 1306 to decrease. Similarly, if $S_{REF}$ 1416 is less than $V_{REF}$ 1470, ctl8 1412 and the shunt current are reduced, allowing $V_{RAW}$ 1306 to increase once again. This control loop has a very small time constant of approximately 2 µS to ensure proper operation.

In this embodiment, series regulator 1320 monitors ctl8 1412 signal (which contains AM messages/data) to ensure that shunt8 1310 pulls a minimum of 100 µA. This is desirable, because during reception of long bursts of modulation, the series impedance adapts in an attempt to maintain 500 µA through shunt8 1310. Without ensuring a minimum shunt8 current, when incoming modulation stops, shunt8 may turn off completely, making reception of subsequent messages/data difficult. Ctl8 1412 is used for several other purposes as further described below.

In particular, series regulator 1320 controls the ratio of currents dissipated by shunt8 1310 and shunt5 1330. Series regulator 1320 monitors the current through shunt8 1310 and adjusts the series impedance, so that the average current in the steady-state (no modulation) through shunt8 1310 is about 500 µA. The series control loop has a longer time constant of approximately 1 mS, so that the average shunt currents do not substantially change during message/data reception. This ensures that incoming data causes ctrl8 1412 to provide the best possible signal to receiver 1350. During message/data transmission from Tag 106 to Target 104, transmitter 1340 shorts out series impedance 1420, and a series impedance control circuit 1422 is disabled, so that the series impedance will return to its previous value when outgoing modulation ends. The controlled voltage difference between $V_{RAW}$ 1306 (8V) and $V_{DD}$ 810 (5V) provides a fixed 3V modulation depth for transmitting messages/data from Tag 106 to Target 104. A resistor 1424, in parallel with series regulator 1320, ensures that ample current flows into $V_{DD}$ 810 from $V_{RAW}$ 1306.

Shunt5 1330 regulates $V_{DD}$ 810 to 5V. $V_{DD}$ 810 powers digital subsystem 304 and most of the analog circuits. Shunt8 1330 dissipates most of the excess current coming into Tag ASIC 302 with a fast control loop and can rapidly respond to 2 mA load transients on $V_{DD}$ 810 within approximately 10 to 15 μs (with a 10 nf FRA-M reservoir capacitor across the supply).

Shunt5 1330 operates as follows in this embodiment. A comparator 1430 of shunt5 1330 compares $V_{DD}$ 810 (sampled through a resistive divider 1482 to generate a $sv_{DD}$ 1432 signal) with the bandgap reference voltage, $V_{REF}$ 1470, to produce a ctrl5 1434 signal. Ctrl5 1434, in turn, controls the current flowing through shunt5 1330 so as to maintain a constant voltage at $V_{DD}$ 810. If $sv_{DD}$ 1432 is less than $V_{REF}$ 1470, ctrl5 1434 decreases and the current through shunt5 1330 decreases, thereby allowing $V_{DD}$ 810 to increase. Similarly, if $sv_{DD}$ 1432 increases beyond $V_{REF}$ 1470, ctrl5 1434 increases and shunt5 1330 pulls more current.

If pwrup1 1442 is high (i.e., de-asserted), ctrl5 1434 is shorted to ground, disabling any shunt action. This prevents shunt5 1330 from operating before the $V_{REF}$ 1470 has reached steady-state.

Shunt5 1330 also includes a comparator 1436 that detects when the rail of $V_{DD}$ 810 drops below a low voltage threshold (about 4.7V in this embodiment of the invention). Comparator 1436 compares $V_{DD}$ 810 (sampled through a resistive divider 1484 to generate a $sv_{DD}lo$ 1435 signal) with $V_{REF}$ 1470 and generates a $lowv_{DD}$ 1438 signal. The $lowv_{DD}$ 1438 signal indicates that $V_{DD}$ 810 is too low to allow FRAM access by the digital subsystem 304 and triggers a rstl 1460 signal.

Transmitter 1340 shorts out the series impedance for outgoing messages/data (from Tag 106 to Target 104) in accordance with a txd 1446 signal (to_target 806). When input signal, txd 1446, is taken low, $V_{RAW}$ 1306 shorts to $V_{DD}$ 810 as indicated above. As $V_{RAW}$ 1306 shorts to $V_{DD}$ 810, shunt8 1310 and series regulator 1320 are disabled so that their control voltages do not change, allowing the steady state point to be maintained once modulation ends.

Series impedance control circuit 1422 monitors ctl8 1412 and adapts accordingly, so that shunt8 1310 shunts only 500 μA. When an input signal, outen 1444 (output enable), is de-asserted, the output drive to ctl8 1412 is disabled. Ctl8 1412 is therefore held at its current value by the stray capacitance on this node. When outen 1444 is asserted, shunt8 1310 operates normally. In operation, outen 1444 is connected to txd 1446 signal, which signal enables modulation from Tag 106 to Target 104 by shorting $V_{RAW}$ 1306 to $V_{DD}$ 810 as explained above. During modulation from Tag 106 to Target 104, ctl8 1412 is held constant. When the modulation ceases, ctl8 1412 returns to approximately the same value it had before modulation started.

Receiver 1350 detects incoming messages/data (from Target 104 to Tag 106) by monitoring ctl8 1412. Ctl8 1412 increases as RF field 110 increases and decreases when RF field 110 falls back into an idle state. In this embodiment, ctl8 1412 typically varies by 150 to 200 mV as messages/data are received. Receiver 1350 extracts messages data by comparing ctl8 1412 to the average value of ctl8 1412. As would be apparent to one skilled in the relevant art, the average value of ctl8 1412 can calculated by several well known circuit configurations. Txd 1446 resets comparator 1418 during periods when Tag 106 is modulating to ensure that receiver 1350 remains in the correct state after transmission from Tag 106 to Target 104. Comparator 1418 is reset when ctl8 1412 is low (i.e., while outgoing modulation is occurring). A rxd signal 1450 (from_target 804), goes low when ctl8 1412 increases from steady-state (i.e., when the RF field 110 increases in strength) and goes high when ctl8 1412 decreases (i.e., when the RF field 110 falls back to its idle state).

Reset generator 1360 produces two reset signals, a rstl 1460 signal and reset 802 signal. Rstl 1460 is active low and used by the analog circuitry. Rstl 1460 is de-asserted after power-up when shunt8 1310 begins to pull current (if $V_{REF}$ 1470 is powered-up) and is asserted when the $V_{DD}$ 810 rail drops below about 4.7V, or when $V_{RAW}$ 1306 drops below the power-up threshold (approximately 3V). While rstl 1460 is asserted, clamp circuit of shunt8 1310 is disabled (i.e., the minimum current pulled by shunt8 1310 can be zero). When rstl 1460 is de-asserted, clamp circuit or comparator 1418 is enabled, and shunt8 1310 will pull at least the 100 μA minimum current.

Reset 802 is active high and output to digital subsystem 304. Reset 802 is asserted during power-up so that digital subsystem 304 does not begin to operate until the circuit has reached a stable state. Reset generator 1360 monitors ctl8 1412 and asserts reset 802 until shunt8 1310 starts to pull current when $V_{RAW}$ 1306 reaches 8V. When shunt8 1310 begins to draw current, comparator 1418 of shunt8 1310 asserts ctl8 1412, which in turn de-asserts reset 802.

After reset 802 is de-asserted, shunt5 1330 monitors $V_{DD}$ 810 during operation with comparator 1436. When $V_{DD}$ 810 drops below 4.7 Volts, comparator 1436 asserts $lowv_{DD}$ 1438, which in turn asserts reset 1462 to again inhibit operation of digital subsystem 304. Reset generator 1360 also monitors the state of noclk 1440. If RF field 110 from Target 104 is interrupted, causing noclk 1440 to be asserted, reset 802 is generated. This guarantees a fast reset 802 when used in conjunction with a Target operating in the "pulsed RF" mode.

While the invention has been particularly shown and described with reference to several preferred embodiments thereof, it will be understood by those skilled in the relevant art that various changes in form and details may be made therein without departing from the spirit and scope of the invention as defined in the appended claims.

What is claimed is:

1. A smart card for use with a pulsed RF field generated by a target, the smart card comprising:

an application specific integrated circuit comprising an analog subsystem comprising a modulator/demodulator;

a digital subsystem comprising a controller and a data memory bank, wherein the controller includes a state machine memory and a state address register adapted to index the state machine memory, and wherein the digital subsystem is adapted for processing data received from the target; and a clock circuit for generating a fast mode clock signal for execution of instructions and a slow mode clock signal for data communication.

2. The smart card of claim 1, wherein the smart card is adapted for use in a mass-transit fare collection system.

3. The smart card of claim 1, further comprising a host computer operably coupled to a target.

4. The smart card of claim 1, wherein the controller is operably coupled through a bit-serial data bus to the data memory bank.

5. The smart card of claim 1, wherein the state machine memory includes a predetermined lookup table and wherein each line of the predetermined lookup table contains an instruction word.

6. The smart card of claim 5, wherein the predetermined lookup table is stored in a read-only memory and each address within the read-only memory comprises a state of the state machine.

7. The smart card of claim 5, wherein each of the instruction words is partitioned into a plurality of instruction fields and each instruction field provides control for the digital subsystem.

8. The smart card of claim 5, wherein the instruction words are selected from the group consisting of Istep, Icntl, Iflag, Itcd, Itna, Imac, Ikey, Ibus, Ispeed, and Ivalue instruction fields.

9. The smart card of claim 5, wherein the state address register includes a linear feedback shift register.

10. The smart card of claim 9, wherein the linear feedback shift register is operably connected to the state machine memory and controls the instruction words.

11. The smart card of claim 5, wherein the instruction words include an instruction field for providing null, ball, btrue, bfalse, bcount, btime, ltime, and getedge operations.

12. The smart card of claim 1, wherein the controller further includes a control register operably coupled to the state machine memory and wherein the control register stores instruction words indexed by the state address register.

13. The smart card of claim 12, wherein the control register is a 32-bit register.

14. The smart card of claim 1, wherein the data memory bank includes a data memory.

15. The smart card of claim 14, wherein the data memory is a ferroelectric random access memory.

16. The smart card of claim 14, wherein the data memory includes a data buffer and a data storage buffer.

17. The smart card of claim 16, wherein the temporary buffer includes a tag identifier buffer, a tag random number buffer, and a host random number buffer.

18. The smart card of claim 14, wherein the data memory is partitioned into blocks and each of the blocks is partitioned into pages.

19. The smart card of claim 18, wherein each of the blocks includes an application type buffer, a read key, and a write key.

20. The smart card of claim 14, wherein the data memory verifies the integrity of incoming data in a four-page buffer before writing the data to a data storage buffer.

21. The smart card of claim 1, wherein the fast mode operates at approximately 1.7 megabits per second.

22. The smart card of claim 1, wherein the slow mode operates at approximately 115.2 kilobits per second.

23. The smart card of claim 1, wherein the smart card further comprises a checker circuit.

24. The smart card of claim 1, wherein the smart card further comprises a timer register.

25. The smart card of claim 1, wherein the smart card further comprises a counter register.

26. The smart card of claim 1, wherein the smart card further comprises a bus driver.

27. The smart card of claim 1, wherein the smart card further comprises a flag register and validity register.

28. The smart card of claim 1, wherein the smart card further comprises a message authentication code register.

29. The smart card of claim 1, wherein the smart card further comprises a keystream generator.

30. A smart card for use with a pulse RF field generated by a target, the smart card comprising:
an antenna;
an application specific integrated circuit comprising an analog subsystem comprising a modulator/demodulator; and
a digital subsystem comprising a controller and a data memory bank, wherein the controller includes a state machine comprising a nonvolatile memory having a plurality of address locations, each address location comprising a state of the state machine and a state address register adapted to index the plurality of address locations;
wherein the application specific integrated circuit further comprises a clock circuit for generating a fast mode clock signal for execution of instructions and a slow mode clock signal for data communication.

* * * * *